US011265474B2

(12) United States Patent
Dolgin et al.

(10) Patent No.: US 11,265,474 B2
(45) Date of Patent: Mar. 1, 2022

(54) ZOOM SETTING ADJUSTMENT FOR DIGITAL CAMERAS

(71) Applicant: QUALCOMM Incorporated, San Diego, CA (US)

(72) Inventors: Yuri Dolgin, Haifa (IL); Yuval Schwartz, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 16/820,251

(22) Filed: Mar. 16, 2020

(65) Prior Publication Data

US 2021/0289140 A1   Sep. 16, 2021

(51) Int. Cl.
*H04N 5/232* (2006.01)
*G06F 16/44* (2019.01)

(52) U.S. Cl.
CPC ... *H04N 5/23296* (2013.01); *H04N 5/232933* (2018.08); *H04N 5/232939* (2018.08); *G06F 16/44* (2019.01)

(58) Field of Classification Search
CPC ......... H04N 5/23296; H04N 5/232933; H04N 5/232939; G06F 16/44; G06T 2200/24
See application file for complete search history.

(56) References Cited

U.S. PATENT DOCUMENTS

2009/0284619 A1* 11/2009 Akao ..................... H04N 5/772
                                                          348/231.3
2010/0328513 A1* 12/2010 Ryu ................. H04N 5/232122
                                                          348/333.02
2011/0032412 A1    2/2011 Higuchi
2011/0128367 A1*  6/2011 Yoshioka ............ G06F 3/04845
                                                          348/79
2011/0316884 A1* 12/2011 Giambalvo ............. G06F 16/44
                                                          345/660

(Continued)

FOREIGN PATENT DOCUMENTS

DK    201670627 A1    2/2018
EP      3165955 A1    5/2017

OTHER PUBLICATIONS

ITU-T H.265, "Series H: Audiovisual and Multimedia Systems, Infrastructure of audiovisual services—Coding of moving video, High efficiency video coding," The International Telecommunication Union. Dec. 2016, 664 Pages.

(Continued)

*Primary Examiner* — Hung H Lam
(74) *Attorney, Agent, or Firm* — Qualcomm Incorporated

(57) ABSTRACT

In general, techniques are described regarding generating, based on zoom settings, various sets of frames of image data (e.g., video data). Cameras comprising one or more camera processors configured to perform the techniques are also disclosed. The camera processor(s) receive a plurality of frames of image data. The camera processor(s) receive, via a user interface, a zoom setting for each of the plurality of frames. The camera processor(s) may generate a first set of frames according to the zoom settings. The camera processor(s) determine a second set of frames, where the second set of frames are different from the first set of frames. The second set of frames may comprise a second zoom that is different than a first zoom applied to the first set of frames.

28 Claims, 8 Drawing Sheets

(56) References Cited

U.S. PATENT DOCUMENTS

| | | | |
|---|---|---|---|
| 2013/0016128 A1* | 1/2013 | Bhatt | G06T 3/40 345/661 |
| 2016/0086309 A1* | 3/2016 | Hsu | G06T 3/4015 382/162 |
| 2017/0041529 A1* | 2/2017 | Park | H04N 5/23216 |
| 2017/0094184 A1 | 3/2017 | Gao et al. | |
| 2018/0262691 A1* | 9/2018 | Wakabayashi | H04N 5/2254 |
| 2019/0082101 A1 | 3/2019 | Baldwin et al. | |

OTHER PUBLICATIONS

International Search Report and Written Opinion—PCT/US2021/021751—ISA/EPO—dated Jun. 22, 2021.

* cited by examiner

ZOOM SETTING ADJUSTMENT FOR DIGITAL CAMERAS

TECHNICAL FIELD

This disclosure relates to image capture and processing.

BACKGROUND

Image capture devices are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

Certain digital cameras feature the ability to capture specified portions of a potential field-of-view (FOV), such as with zoom-in, zoom-out, panoramic, telescope, ultrawide, telephoto, or periscope features. A potential FOV or full FOV, as used herein, generally refers to the entirety of pixels that a particular image sensor is configured to use to sense a scene or image sequence. Such camera features allow a digital camera, using an image sensor and camera processor, to enhance, or otherwise alter, the capture of a scene (or sequence of images, in the case of a video). Such enhancement or alteration may depend on zoom settings (e.g., zoom commands, pinch-to-zoom commands, aspect ratio settings, etc.). In the case of video, a camera processor may apply zoom settings to multiple frames of image data.

In some examples, a camera processor may perform a digital zoom and/or optical zoom in order to achieve a target zoom level (e.g., a zoom level desired by a user). For example, the camera processor may use certain digital zoom techniques to crop and/or scale pixels corresponding to the potential FOV in order to achieve the target zoom level. In addition, a user or the camera processor may employ optical zoom techniques (e.g., activating a moving prism, lens actuation, performing a lens transition, etc.) that effectively change the focal length of the image capture device in order to achieve the target zoom level.

In some examples, certain image capture devices may include multiple image sensors and/or multiple lenses that may be used in conjunction with one another. For example, a lens may be actuated or moved to allow for the capture of image data at different focal lengths. Example lens types include wide-angle lenses, ultra-wide-angle lenses, telephoto lenses, telescope lenses, periscope-style zoom lenses, fisheye lenses, macro lenses, prime lenses, or various combinations thereof. In one example, a dual camera configuration may include both a wide lens and a telephoto lens. Similarly, a triple camera configuration may include an ultra-wide lens, a wide lens, and a telephoto lens. By using multiple lenses and/or image sensors, image capture devices are able to capture images with different FOVs and/or zoom levels.

SUMMARY

In general, this disclosure describes camera processing techniques involving digital cameras having image sensors, camera processors, and zoom capabilities. The image sensor(s) may be configured to capture frames of image data through one or more lenses of the digital camera. For example, the image sensor(s) may capture a single frame (e.g., a still-image shot) and/or multiple frames of the image data (e.g., video data). The image sensor(s) may transfer the captured frames to one or more camera processors for further processing. The camera processor(s) may perform various processing techniques using the received frames, such as real-time processing, offline processing, and/or post-processing of the frames. In one example, the camera processor(s) may apply, to the frames, zoom settings and perform automatic image capture adjustment techniques, such as auto-focus, auto-exposure, and/or auto-white-balance techniques ("3A" techniques). The camera processor(s) may perform such processing techniques based on user commands, machine learning (ML) models, artificial intelligence (AI) algorithms, preprogrammed camera settings, etc.

In some examples, the camera processor(s) may process the frames received from image sensor(s), such that the frames may be displayed on a display device (e.g., mobile device screen, tablet screen, computer monitor, etc.). In the case of a user zoom command, automatic zoom command, or other zoom setting, the camera processor(s) or central processing unit (CPU) may cause a display device to display a first set of frames as preview frames. The first set of frames may be displayed according to the zoom settings. In some examples, the first set of frames may represent zoom level transitions that represent the zoom settings (e.g., a first set of zooming frames). In such examples, the first set of preview frames provide, on the display device, a visual representation of a scene according to the zoom settings (e.g., a preview scene). The preview scene may include a scene-to-be-captured by the digital camera or a scene that is being recorded by the digital camera. In such examples, the camera processor(s) may process the frames for display via a display interface. The camera processor(s) may do this in addition to, or in lieu of, storing the first set of frames to a memory device, such as to system memory.

In some examples, camera processor(s) may apply zoom settings (e.g., zoom levels, zoom level transitions, etc.) to a plurality of incoming frames of image data. The digital camera may receive user input identifying the particular zoom settings. In some examples, the digital camera may receive, from a user, zoom settings via a user interface (UI) of the digital camera or, in some instances, via a UI of another device. In some examples, the zoom settings are derived or determined from gestures (e.g., pinch-to-zoom gestures, hand gestures, gaze gestures, head gestures, etc.), slide bar manipulations, selectable zooming icons (e.g., a 2.0× zoom icon), manual or automatic lens actuations, pre-programmed zoom settings, etc.

In some examples, the UI or the camera processor(s) may include particular zooming sensitivities that essentially provide instantaneous responsiveness to user zoom commands in terms of the preview frames displayed via a display device. In some instances, however, a user may find difficulty with accurately controlling the camera processor to generate a smooth set of zooming frames relative to a particular area of the frame. That is because the user input may cause the camera processor(s) to perform unintended zoom transitions, such as an over zoom, under zoom, etc., relative to an area of the frame in which the user may have originally intended to zoom without the ultimately extraneous zoom transitions. When recording video, the camera processor(s) may store the zooming frames representing the zoom transitions, in which the zoom transitions may appear exaggerated or haphazard in playback. Similarly while providing a preview of the frames via a display device, the camera processor(s) may provide preview frames having jerky zoom transitions, user zoom corrections, etc., that a user may wish to eliminate or otherwise smooth, at least with respect to the ultimately stored version of the frames as compared to the preview frames.

In accordance with techniques of this disclosure, one or more camera processor(s) may differentiate between the processing of preview frames relative to frames that are stored in memory for longer term access and/or post-processing. For example, the techniques of this disclosure allow camera processor(s) to receive zoom settings, such as coarse pinch-to-zoom inputs, during capture of a plurality of frames. The camera processor(s) may determine and/or generate, based on the plurality of captured frames, a first set of frames according to the zoom settings (e.g., a first set of zooming frames). The camera processor(s) may output the first set of frames as a set of preview frames.

In addition, the camera processor(s) may determine and/or generate a second set of frames that differs from the first set of frames. In some examples, camera processor(s) may determine and/or generate the second set of frames based on the plurality of captured frames or in some instances, based on at least a subset of the first set of frames. That is, camera processor(s) may reuse or repurpose one or more frames of the first set of frames in determining and/or generating the second set of frames. In some examples, camera processor(s) may determine and/or generate the second set of frames from at least a subset of the plurality of captured frames. In any case, camera processor(s) may determine and/or generate the second set of frames so as to be different than the first set of frames. In one example, camera processor(s) may determine and/or generate a particular frame from the second set of frames so as to have a different zoom setting applied to that frame compared to a zoom setting applied to a corresponding frame from the first set of frames. In some examples, the different set of frames may represent at least one zoom transition that is different from a corresponding transition represented by the first set of frames. In any case, the camera processor(s) may determine and/or generate frames for at least two sets of frames, such that the two set of frames represent zoom settings that are different from one another. In some examples, the second set of frames may represent a refined set of zoom transitions. That is, camera processor(s) 14 may refine a first set of zoom transitions based on zoom settings (e.g., zoom commands, gestures, camera movement, etc.) and/or with the assistance of AI algorithms or ML models, as described herein.

As used herein, "zooming" frames generally refer to frames that have zoom settings applied to at least some of the frames. In some examples, camera processor(s) may apply one or more zoom settings to frames, such that that the frames dynamically zoom-in on, or -out of, a scene being captured. In addition, camera processor(s) may apply a zoom setting to achieve a statically zoomed-in or zoomed-out view. The static zoom may be relative to a previously-applied zoom level or a default zoom level. In some examples, the default zoom level is 1.0× (e.g., no applied zoom).

In one example, the zooming frames may be determined and/or generated using optical zoom techniques (e.g., moving prisms, moving lenses, actuating lenses, moving camera or computing devices, etc.), digital zoom techniques (e.g., digital cropping, digital scaling, pixel binning adaptations, etc.), or combinations thereof. In some examples, a computing device may have continuous optical zoom capabilities that may track a target zoom level identified from zoom settings, such as user-defined zoom settings. In any case, the zoom settings may include settings that cause the camera processor(s) to implement certain optical zoom techniques, digital zoom techniques, or combinations thereof. In some examples, camera processor(s) may use optical zoom techniques to determine and/or generate at least a first subset of frames of the second set of frames, where the zoom settings represent particular types of zoom transitions (e.g., zoom-in transitions). In some examples, when determining the second set of frames, camera processor(s) may generate the second set of frames using digital zoom techniques. In such examples, the second set of frames may represent different types of zoom transitions. In any case, the second set of frames may represent a second set of zoom transitions that are different from a first set of zoom transitions represented by a first set of frames. In addition, the digital camera may determine and/or generate the second set of frames representing at least one different zoom setting relative to the first set of preview frames, where the digital camera may achieve such zoom settings for the second set of frames using various zoom techniques (e.g., digital zoom techniques and/or optical zoom techniques).

In one example, the techniques of the disclosure are directed to an apparatus configured for camera processing, the apparatus comprising: a memory configured to store image data, and one or more processors in communication with the memory, the one or more processors configured to: receive a plurality of frames of the image data; receive, via a user interface, a zoom setting for each of the plurality of frames; generate, according to the zoom settings, a first set of frames; determine, based on the zoom settings, a second set of frames, the second set of frames being different from the first set of frames; and output, for further processing, the second set of frames.

In another example, the techniques of the disclosure are directed to a method for camera processing, the method comprising: receiving a plurality of frames of image data; receiving, via a user interface, a zoom setting for each of the plurality of frames; generating, according to the zoom settings, a first set of frames; determining, based on the zoom settings, a second set of frames that differ from the first set of frames; and outputting, for further processing, the second set of frames.

In another example, the techniques of the disclosure are directed to an apparatus configured for camera processing, the apparatus comprising: means for receiving a plurality of frames of image data; means for receiving, via a user interface, a zoom setting for each of the plurality of frames; means for generating, according to the zoom settings, a first set of frames; means for determining, based on the zoom settings, a second set of frames, the second set of frames and the first set of frames differing from one another; and means for outputting, for further processing, the second set of frames.

In another example, the techniques of the disclosure are directed to a non-transitory computer-readable storage medium having stored thereon instructions that, when executed, cause one or more processors to: receive a plurality of frames of image data; receive, via a user interface, a zoom setting for each of the plurality of frames; determine, according to the zoom settings, a first set of frames; determine, based on the zoom settings, a second set of frames, the second set of frames differing from the first set of frames; and output the second set of frames.

The details of one or more examples are set forth in the accompanying drawings and the description below. Other features, objects, and advantages will be apparent from the description, drawings, and claims.

DETAILED DESCRIPTION

Figure 1:
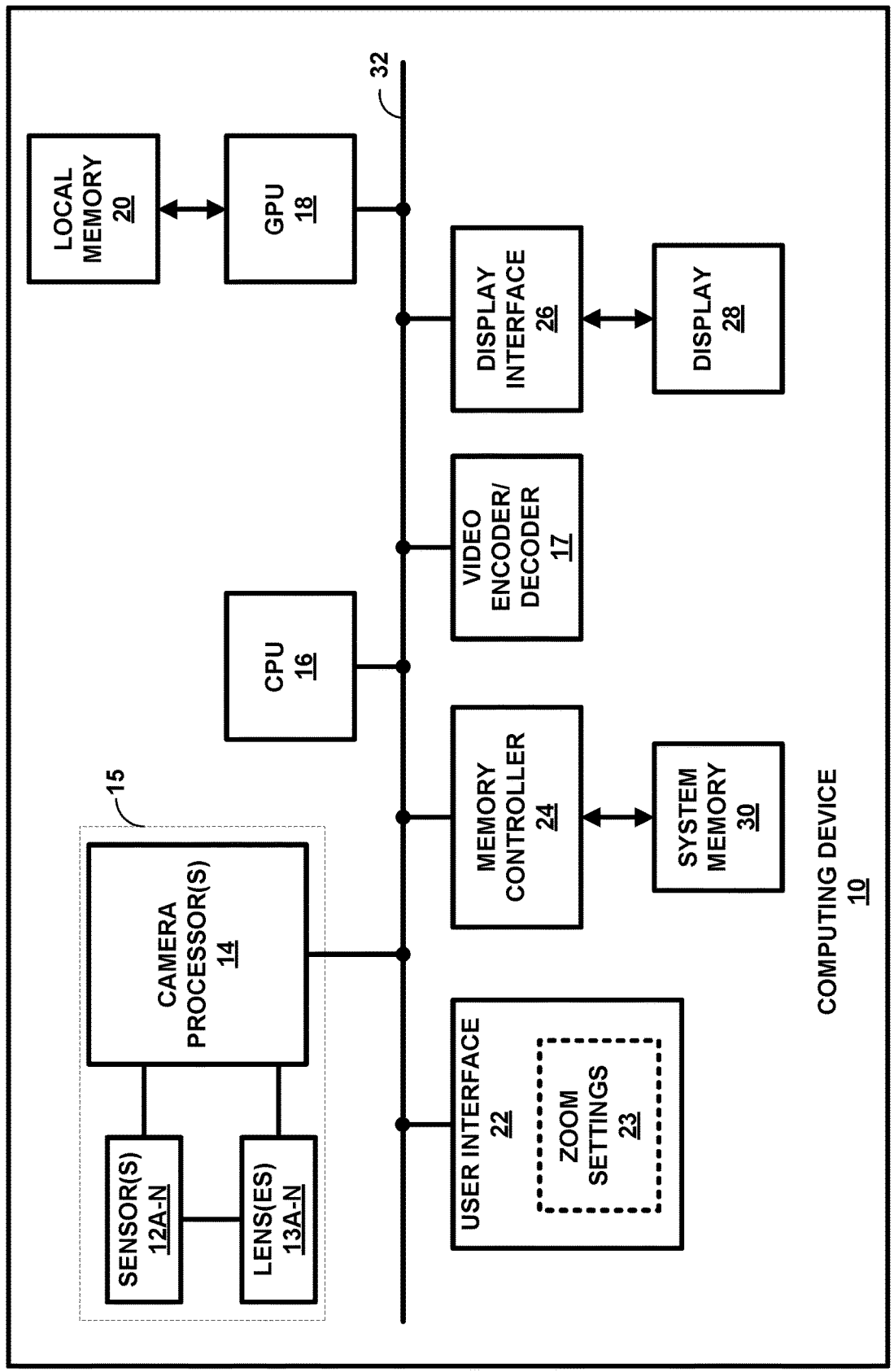
FIG. 1 is a block diagram of a device configured to perform one or more of the example techniques described in this disclosure.

In general, this disclosure describes techniques for smoothing zoom transitions of frames of image and/or video data. Cameras comprising camera processors configured to perform the techniques are also disclosed. Camera processor(s) may receive a plurality of frames of image/ video data, such as from one or more image sensor(s). The camera processor(s) may also receive, via a user interface, a zoom setting for each of the plurality of frames (e.g., 1.0× zoom, 2.0× zoom, etc.). That is, a user may provide various zoom commands that the camera processor(s) may apply to a first set of frames (e.g., a first set of preview frames) as the plurality of frames are received from the image sensor(s). As such, the camera processor(s) may determine and/or generate, according to the zoom settings, a first set of frames that are configured for display (e.g., preview display) and/or for storage. In some examples, the first set of frames represent a first set of zoom settings (e.g., a first set of zoom transitions).

Because it can oftentimes be difficult for a user, when recording video, to carefully, finely, or smoothly zoom in and out to capture a desired portion of a scene, the frames configured for preview display may include inadvertent zoom settings (e.g., an over zoom, under zoom, etc.) that may appear exaggerated during playback of the video. In some examples, a zoom setting may include a panning of a scene or a command for a camera to pan across a scene. In such examples, a user may pan across a scene in order to capture the scene having a specific image quality that, in some instances, complements particular zoom transitions. In another example, the camera processor(s) may apply zoom transitions that appear jumpy due to certain user interface (UI) mechanisms that are configured to detect user input (e.g., touch screens, gaze trackers, etc.).

In an illustrative example, a user, while providing zoom command inputs, may expect certain objects in the scene to be centered in a zooming frame or generally centered in the zooming frames. The user, however, may pan across the scene and/or zoom in a manner that the camera processor no longer outputs generally centered frames, as the user may have intended. In such instances, the user may subsequently adjust the zoom setting, such as by adjusting a zoom command, panning differently (e.g., slower, faster, correcting, overcorrecting, etc.), adjusting a pointing direction of the camera, etc. In any case, one or more processors may detect the zoom command input and adjust the zoom settings in turn. The one or more processors may determine, based on the zoom settings or based on an adjusted set of zoom settings, a second set of frames, where the second set of frames is different than the first set of frames (e.g., the first set of preview frames). In some examples, the one or more processors may adjust the zoom settings so as to adjust zoom transitions, zoom levels, digital-crop regions of the frames, etc.

In accordance with techniques of this disclosure, a camera processor may advantageously differentiate a first set of preview frames from a second set of frames, where the second set of frames may be recorded for longer term storage and/or post-processing, such as a video encoding. In such examples, the second set of frames may be stored as a video file. The second set of frames may differ from the first set of preview frames. For example, a frame N of the first set of frames may include a first zoom setting, and a corresponding frame N of the second set of frames may include a second zoom setting that is distinct from the first zoom setting. That is, in some examples, the camera processor may determine an adjusted zoom setting to be applied to frame N of the plurality of frames in order to determine the corresponding frame N of the second set of frames that then differs from corresponding frame N of the first set of frames. Likewise, a frame N+1 of the first set of frames and a corresponding frame N+1 of the second set of frames may represent zoom settings that differ from one another. In any case, both sets of frames, may be generated based at least in part on the frames of the plurality of frames received from image sensor(s) 12.

In some examples, the camera processor(s) may derive, from zoom settings received via a UI, a smooth zoom rate as the second set of zoom settings. In an illustrative example, the user may be attempting to zoom on an object from 1.0× to 10.0× zoom. Due to certain UI mechanisms, however, the camera processor(s) may instead receive from the user abrupt zoom transitions, such as from 1.0× to 12.0× to 8.0× to 11.0× and ultimately to the 10.0× zoom level that the user was ultimately targeting. In this example, the camera processor(s) may derive, from the zoom settings, a smooth zoom rate to be applied to a separately recorded set of frames (e.g., the second set of frames). As such, an adjusted zoom setting may include a smooth zoom rate. In an illustrative example, the smooth zoom rate may include a gradual or continuous zoom rate, for example, a 2.5× zoom level increment per unit time, that causes the camera processor(s) to increase the zoom by the zoom level amount until a targeted zoom level is reached, the targeted zoom level being 10.0× in this example. In such instances, the camera processor(s) may be able to further conserve processing resources when applying such zoom settings to the second set of frames compared to the processing resources used to apply zoom settings representing abrupt or raw zoom transitions. Thus, the example techniques of this disclosure, such as the example described above including zoom rates, provide various advantageous for camera processing compared to an operation of displaying and recording zoom operations using one set of zoom settings.

In addition, smoothed zoom transitions can provide technical advantageous in video coding because abrupt and jerky zoom transitions may present difficulties for a video coder to accurately compress or decompress video frames. That is, the techniques of this disclosure can provide a video coder with an increase in video coding accuracy and/or a decrease in processing resources, such as when coding frames that include zoom settings that have been particularly adjusted so as to smooth certain "raw" zoom settings originally defined by the user, for example, as the result of abrupt or jerky zoom inputs. In addition, a video coder may tend to more accurately perform temporal prediction techniques (e.g., compressing or decompressing P-frames and B-frames in a video coding standard) when the zoom settings are particularly adjusted so as to be different from those zoom settings originally defined by the user.

In some examples, camera processor(s) may determine, based on the plurality of frames received from the image sensor(s), a second set of frames. The second set of frames may be different than the first set of frames. The second set of frames may represent a second set of zoom transitions (e.g., smoothed zoom transitions). In such instances, the second set of zoom transitions is distinct from a first set of zoom transitions represented by the first set of frames. In any case, the camera processor(s) may output, for further processing, the second set of frames or in some instances, may output the second set of zoom transitions. In some examples, the output may include an instruction to apply various zoom settings (e.g., adjusted zoom settings) in order to generate the second set of frames. In addition, the camera processor(s) may output the second set of frames, or the second set of zoom transitions, to a video coder, storage device, and/or display device. Regardless, the camera processor(s) may output the second set of frames so as to be stored as a video file. In an example, a memory controller may determine, from the camera processor(s) output, the second set of frames and generate the second set of frames by storing the second set of frames as a video file. In another example, a video coder may determine, from the camera processor(s) output, the second set of frames and generate the second set of frames via an encoding of the second set of frames. In such examples, the video coder may encode the second set of frames so as to represent an adjusted set of zoom settings relative to the first set of zoom settings corresponding to the first set of preview frames.

FIG. 1 is a block diagram of a computing device 10 configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras. In some examples, computing device 10 may include a central processing unit (CPU) 16, a video encoder/decoder 17, a graphics processing unit (GPU) 18, local memory 20 of GPU 18, user interface 22, memory controller 24 that provides access to system memory 30, and display interface 26 that outputs signals that cause graphical data to be displayed on display 28.

As illustrated in the example of FIG. 1, computing device 10 includes one or more image sensor(s) 12A-N. Image sensor(s) 12A-N may be referred to in some instances herein simply as "sensor 12," while in other instances may be referred to as a plurality of "sensors 12" where appropriate. Computing device 10 further includes one or more lens(es) 13A-N and camera processor(s) 14. Similarly, lens(es) 13A-N may be referred to in some instances herein simply as "lens 13," while in other instances may be referred to as a plurality of "lenses 13" where appropriate. In some examples, sensor(s) 12 represent one or more image sensors 12 that may include processing circuitry, an array of pixel sensors (e.g., pixels) for capturing representations of light, memory, an adjustable lens, and an actuator to adjust one or more of lenses 13.

As shown in FIG. 1, a camera 15 may refer to a collective device including one or more image sensor(s) 12, one or more lens(es) 13, and one or more camera processor(s) 14. In some examples, multiple cameras 15 may be included with a single computing device 10 (e.g., a mobile phone having one or more front facing cameras and one or more rear facing cameras). In some examples, one computing device 10 may include a first camera 15 having one or more image sensors 12 and one or more lenses 13, and a second camera 15 having one or more image sensors 12 and one or more lenses 13, etc. It should be noted that while some example techniques herein may be discussed in reference to frames received from a single camera (e.g., from a single image sensor), the techniques of this disclosure are not so limited, and a person of skill in the art will appreciate that the techniques of this disclosure may be implemented for any type of cameras 15 and combination of cameras 15 that are included with computing device 10. For example, a composite frame of image data may be created from frames received from multiple cameras or from frames corresponding to different focal lengths. As such, camera processor(s) may apply zoom settings to composite frames.

While some example techniques are described herein with respect to a single sensor 12, the example techniques are not so limited, and may be applicable to various camera types used for capturing images/videos, including devices that include multiple image sensors and/or multiple lens types. For example, computing device 10 may include dual lens devices, triple lens devices, 360-degree camera lens devices, etc. As such, each lens 13 and image sensor 12 combination may provide various zoom levels, angles of view (AOV), focal lengths, FOVs, etc. In some examples, particular image sensors 12 may be allocated for each lens 13, and vice versa. For example, multiple image sensors 12 may be each allocated to different lens types (e.g., wide lens, ultra-wide lens, telephoto lens, and/or periscope lens, etc.).

In examples including multiple lenses 13, CPU 16 and/or camera processor(s) 14 may activate particular lenses 13, or combinations of lenses 13, in response to receiving user input (e.g., via user interface 22). For example, CPU 16 and/or camera processor(s) 14 may receive user input via user interface 22 that includes zoom settings 23 (e.g., user selection of a particular lens 13 (e.g., a fisheye lens camera), a zoom command, etc.). In another example, camera processor(s) 14 may receive zoom settings 23 irrespective of user interface 22, such as from system memory 30 or CPU 16. In one example, camera processor(s) 14 may receive zoom settings 23 via user interface 22 and may also retrieve preprogrammed zoom settings from system memory 30. In such examples, camera processor(s) 14 may use either zoom settings individually, or in some instances, may combine zoom settings received from different sources. Camera processor(s) 14 may utilize the zoom settings (e.g., combined or otherwise) in order to generate a set of preview frames for display. Camera processor(s) 14 may also use the zoom settings in order to derive a second set of zoom settings in order to determine a second set of frames, where the second set of frames may be generated according to the derived second set of zoom settings.

In some examples, CPU 16 may automatically determine which lens 13 to activate and either select an initial lens 13 to activate or transition from one lens 13 to another lens 13. For example, CPU 16 and/or camera processor(s) 14 may determine which lens 13 to activate upon detecting an operating condition that satisfies certain lens-selection criteria (e.g., zoom level satisfying a predefined camera transition threshold, a change in lighting conditions, input from a user calling for a particular lens 13, etc.). In some examples, multiple cameras may be used in conjunction with one another to capture one synthetic image (e.g., panoramic image), such that camera processor(s) 14 or CPU 16 may process one synthetic image based on the image captures from sensor(s) 12. A panoramic image may represent a different zoom setting relative to a non-panoramic image.

In some examples, camera processor(s) 14 may cause an adjustment to an effective focal length of one or more lenses 13 and one or more image sensors 12. For example, camera processor(s) 14 may initiate a lens actuator that moves lens 13 toward or away from a respective image sensor 12. In another example, camera processor(s) 14 may initiate a lens transition from a first lens 13A to a second lens 13B. In any event, camera processor(s) 14 may adjust the focal length at which a frame of image data is captured via lenses 13 and image sensors 12. Camera processor(s) 14 may perform such adjustments in response to a zoom setting (e.g., a zoom command, automatic zoom programming, zoom level input, zoom transition, etc.). In some examples, camera processor(s) may perform such adjustments while performing various auto focus techniques (e.g., capturing multiple frames at different focus levels, creating composite frames by fusing multiple frames together, etc.).

In some examples, camera processor(s) 14 may include a plurality of camera processors performing various processing operations in tandem or in parallel with one another. Camera processor(s) 14 may include two or more camera processor(s) 14, such as dual on-the-fly camera processor(s) 14. In an illustrative example, a first camera processor 14 may provide a first set of frames of video data to display interface 26 for generating preview frames. That is, first camera processor 14 may determine a first set of preview frames, output the first set of preview frames to memory, and cause display 28 to generate the first set of preview frames for display. Display interface 26 may cause the preview frames to be displayed, via display 28, during a video recording process or during other previewing sessions.

A second camera processor 14 may determine a second set of frames to be stored as video data, the second set of frames differing from the first set of frames. In any case, both sets of frames may correspond to the plurality of frames captured by image sensor(s) 12. Second camera processor 14 may further output the second set of frames, for example, to video encoder/decoder 17 for video coding. In addition, first camera processor 14 may be used for determining frames of image data for preview display, such as to display a preview of the captured scene before initiating the video recording process or to display a preview of the captured scene during the video recording process. That is, the frames for preview display may show on display 28 as preview frames regardless of user and/or AI input, such as input to start recording a video or to take a picture.

In some examples, the first camera processor 14 may interface with display interface 26 and output a first set of frames to display interface 26 for preview display. The second camera processor 14 may interface with video encoder/decoder 17, or in some instances, system memory 30 or local memory 20. It should be noted that the second set of frames may include a subset of frames from the first set of frames, but in any case, the first set of frames and the second set of frames may differ in terms of the zoom settings represented by each set (e.g., zoom transitions, zoom levels), 3A parameters represented by each set, etc.

In some examples, a single image sensor 12 may correspond to multiple lenses 13. In such examples, light guides may be used to direct light incident on lenses 13 to respective image sensor(s) 12. An example light guide may include a prism, a moving prism, mirrors, etc. In this way, light received from a single lens may be redirected to a particular sensor 12, such as away from one sensor 12 and toward another sensor 12. For example, camera processor(s) 14 may cause a prism to move and redirect light incident on one of lenses 13 in order to effectively change the focal length.

Although the various structures of computing device 10 are illustrated as separate in FIG. 1, the techniques of this disclosure are not so limited, and in some examples the structures may be combined to form a system on chip (SoC). As an example, camera processor(s) 14, CPU 16, GPU 18, and display interface 26 may be formed on a common integrated circuit (IC) chip. In some examples, one or more of camera processor(s) 14, CPU 16, GPU 18, and display interface 26 may be formed on separate IC chips. Various other permutations and combinations are possible, and the techniques of this disclosure should not be considered limited to the example illustrated in FIG. 1.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different structures shown in FIG. 1 is merely exemplary, and other configurations of computing devices and/or other image processing systems with the same or different structures may be used to implement the techniques of this disclosure.

In addition, the various components illustrated in FIG. 1 (whether formed on one device or different devices), including sensor(s) 12 and camera processor(s) 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. In addition, examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

In some examples, memory controller 24 may facilitate the transfer of data going into and out of system memory 30. For example, memory controller 24 may receive memory read and write commands, and service such commands with respect to memory 30 in order to provide memory services for various components of computing device 10. In such examples, memory controller 24 may be communicatively coupled to system memory 30. Although memory controller 24 is illustrated in the example of computing device 10 of FIG. 1 as being a processing circuit that is separate from both CPU 16 and system memory 30, in some examples, some or all of the functionality of memory controller 24 may be implemented on one or more of CPU 16, system memory 30, camera processor(s) 14, video encoder/decoder 17, and/or GPU 18.

System memory 30 may store program modules and/or instructions and/or data that are accessible by camera processor(s) 14, CPU 16, and/or GPU 18. For example, system memory 30 may store user applications (e.g., instructions for a camera application), resulting images from camera processor(s) 14, etc. System memory 30 may additionally store information for use by and/or generated by other components of computing device 10. For example, system memory 30 may act as a device memory for camera processor(s) 14. System memory 30 may include one or more volatile or non-volatile memories or storage devices, such as, for example, RAM, SRAM, DRAM, ROM, EPROM, EEPROM, flash memory, a magnetic data media or an optical storage media. In addition, system memory 30 may store image data (e.g., frames of video data, encoded video data, zoom settings, 3A parameters, etc.). In some examples, system memory 30 or local memory 20 may store the image data to on-chip memory, such as in a memory buffer of system memory 30 or local memory 20. In another example, system memory 30 or local memory 20 may output image data in order to be stored external from the memory of a chip or buffer, such as to a secure digital (SD™) card of a camera device or in some instances, to another internal storage of a camera device. In an illustrative example, system memory 30 or local memory 20 may be embodied as buffer memory on a camera processor 14 chip, GPU 18 chip, or both where a single chip includes both processing circuitries.

In some examples, system memory 30 may include instructions that cause camera processor(s) 14, CPU 16, GPU 18, and/or display interface 26 to perform the functions ascribed to these components in this disclosure. Accordingly, system memory 30 may be a computer-readable storage medium having instructions stored thereon that, when executed, cause one or more processors (e.g., camera processor(s) 14, CPU 16, GPU 18, and display interface 26) to perform the various techniques of this disclosure.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

In addition, camera processor(s) 14, CPU 16, and GPU 18 may store image data, user interface data, etc., in respective buffers that are allocated within system memory 30. Display interface 26 may retrieve the data from system memory 30 and configure display 28 to display the image represented by the image data, such as via a user interface 22 screen. In some examples, display interface 26 may include a digital-to-analog converter (DAC) that is configured to convert digital values retrieved from system memory 30 into an analog signal consumable by display 28. In other examples, display interface 26 may pass the digital values directly to display 28 for processing.

In some examples, camera processor(s) 14 may comprise an image signal processor (ISP). For instance, camera processor(s) 14 may include a camera interface that interfaces between sensor(s) 12 and camera processor(s) 14. Camera processor(s) 14 may include additional circuitry to process the image content. Camera processor(s) 14 may be configured to perform various operations on image data captured by sensor 12, including auto white balance, color correction, or other post-processing operations. In some examples, camera processor(s) 14 may execute "3A" algorithms. Such algorithms may include autofocus (AF), auto exposure control (AEC), and auto white balance (AWB) techniques. In such examples, 3A may represent the functionality of a statistics algorithm processing engine, where one of camera processor(s) 14 may implement and operate such a processing engine.

In some examples, camera processor(s) 14 are configured to receive image frames (e.g., pixel data) from sensor(s) 12, and process the image frames to generate image and/or video content. For example, image sensor 12 may be configured to capture individual frames, frame bursts, frame sequences for generating video content, photo stills captured while recording video, preview frames, or motion photos from before and/or after capture of a still photograph. CPU 16, GPU 18, camera processor(s) 14, or some other circuitry may be configured to process the image and/or video content captured by sensor(s) 12 into images or video for display on display 28. Image frames may generally refer to frames of data for a still image or frames of video data or combinations thereof, such as with motion photos. Camera processor(s) 14 may receive pixel data of the image frames in any format. For example, the pixel data may include different color formats, such as RGB, YCbCr, YUV, etc. In any case, camera processor(s) 14 may receive, from image sensor(s) 12, a plurality of frames of image data.

In addition, camera processor(s) 14 may be configured to analyze pixel data and/or output the resulting images (e.g., pixel values for each of the image pixels) to system memory 30 via memory controller 24. Each of the images may be further processed to generate a final image for display. For example, GPU 18 or some other processing unit, including camera processor(s) 14, may perform zooming operations to generate zooming frames, perform color correction, white balance, blending, compositing, rotation, or other operations to generate the final image content for display and/or storage.

In some examples, display 28 may display a first set of frames as a set of preview frames. In such examples, the first set of frames may not necessarily represent frames that are stored to system memory 30. In any case, display 28 displays preview frames that indicate to a user what pixel information an image sensor 12 is capturing at any given moment, either when actively recording content or when simply pointing the camera at a scene prior to recording any content. In some examples, the preview frames may be digitally altered, such as by being digitally cropped and/or scaled, before being displayed to the user. In some examples, camera processor(s) 14 may determine a first set of frames (e.g., a first set of preview frames) and apply a zoom setting to each frame of the first set of frames. In some examples, camera processor(s) 14 may output and generate, for display, the first set of frames having a first set of zoom settings. In some examples, the first set of frames represents a first set of zoom level transitions. From the user perspective, the first set of frames correspond to what a user sees on display 28 when, for example, a camera application is running on the foreground of computing device 10. As discussed herein, display 28 may also display the plurality of frames of image data captured by image sensor(s) 12, where the plurality of frames of image data comprise a different zoom setting than the first set of preview frames.

In some examples, display 28 may display the plurality of frames and the first set of preview frames together in a single display. As such, camera processor(s) 14 may generate the first set of frames according to a first set of zoom settings and determine an adjusted set of zoom settings based on the set of zoom settings. In addition, display 28 may be configured to display a second set of frames, the second set of frames generated based on the adjusted zoom settings. In such instances, the second set of frames may differ from the first set of frames due to the adjusted zoom settings.

In an illustrative example, camera processor(s) 14 or CPU 16 may cause user interface 22 to provide a preview display of different versions of the plurality of captured frames and/or the first set of frames, the first set of frames comprising different zoom settings than the plurality of captured frames. For example, user interface 22 may provide synchronized and/or simultaneous display of multiple sets of frames (e.g., a "picture-in-picture" display). For example, user interface 22 may provide, via display 28, one set of frames showing the full FOV regardless of any requested zoom settings 23. User interface 22 may additionally provide, via display 28, a second set of frames along with the first set of frames. The second set of frames may correspond in time to the first set of frames (e.g., same scene but different perspective or FOV). The second set of frames may provide, in real time or near real time, as camera processor(s) 14 apply adjusted zoom settings 23 to the second set of frames, a preview display of zoom-altered frames (e.g., zooming frames). In some examples, "near-real-time" may mean as close to real time as the transfer of data allows, such as the transfer of pixels from image sensor 12 to the camera processor 14 and the transfer of frame data to display interface 26.

Computing device 10 may include a video encoder and/or video decoder 17, either of which may be integrated as part of a combined video encoder/decoder (CODEC) (e.g., a video coder). Video encoder/decoder 17 may include a video coder that encodes video captured by one or more camera(s) 15 or a decoder that can decode compressed or encoded video data. In some instances, CPU 16 and/or camera processor(s) 14 may be configured to encode and/or decode video data, in which case, CPU 16 and/or camera processor(s) 14 may include video encoder/decoder 17. In any case, video encoder/decoder 17 may be configured to compress or decompress full or at least partially full potential FOV frames of image data received from image sensor(s) 12 (e.g., the plurality of captured frames). Similarly, video encoder/decoder 17 may be configured to compress or decompress the second set of frames representing the adjusted set of zoom settings. In some examples, video encoder/decoder 17 may be further configured to compress or decompress preview frames that represent zoom settings (e.g., the first set of zooming frames generated according to the first set of zoom settings), zoom setting information, etc.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a camera application, a graphics editing application, a media player application, a video game application, a graphical user interface application or another program. One example software application is a camera application. CPU 16 executes the camera application, and in response, the camera application causes CPU 16 to generate content that display 28 outputs. For instance, display 28 may output information such as light intensity, whether flash is enabled, and other such information. The camera application may also cause CPU 16 to instruct camera processor(s) 14 to process the images captured by sensor 12 in a user-defined manner. The user of computing device 10 may interface with display 28 (e.g., via user interface 22) to configure the manner in which the images are generated (e.g., with zoom settings 23 applied, with or without flash, focus settings, exposure settings, video or still images, and other parameters).

In some example, a camera application may allow the user to control various settings of camera 15. To control various settings, the user may provide input to computing device 10 via one or more input devices (not shown) such as a keyboard, a mouse, a microphone, a handheld controller, a remote controller, a gaze tracker, a touch pad or another input device that is coupled to computing device 10 via user interface 22. For example, user interface 22 may receive input from the user to adjust target zoom settings, where the target zoom settings may be derived from zoom settings 23 or may have been previously derived from zoom settings 23. In some examples, CPU 16 may store zoom settings 23 or at least portions thereof. In such examples, certain portions of zoom settings 23 may represent instructions, for camera processor(s) 14, CPU 16, GPU 18, display interface 26, or video encoder/decoder 17, to determine the second set of frames that are different than the first set of frames. In an illustrative example, zoom settings 23 may represent computer-readable instructions (e.g., non-transitory computer-readable instructions) that instruct camera processor(s) 14 on which adjusted zoom setting applies to which frame or frames of the second set of frames. As such, zoom settings 23 may allow the various structures of computing device 10 to generate the second set of frames that represent the particular zoom setting 23.

In some examples, CPU 16 may launch and/or operate the camera application. As described, the camera application may include various options for a user to interact with user interface 22. In such examples, while CPU 16 is operating the camera application, CPU 16 may receive, via user interface 22, input from the user to alter aspect ratios for frames of image data, record video, take a snapshot while recording video, apply filters to an image capture, select a region-of-interest for automatic-focus operations, record slow motion video or super slow motion video, apply night shot settings, capture panoramic image data, etc. CPU 16 may further receive, via user interface 22, a zoom setting for each of a plurality of frames received from image sensor(s) 12.

In some examples, user interface 22 may provide various selectable modes, such as a selectable mode that enables or disables the zoom modes disclosed herein. In some examples, CPU 16 may receive selection of various camera modes, including a camera mode that initiates zoom setting adjustments of this disclosure. When the selectable mode is enabled, camera processor(s) 14 may distinguish the frames of image data provided to display interface 26 from the frames of image data recorded to system memory 30. That is, when the selectable mode is enabled, camera processor(s) 14 may perform both a storing of the full FOV frames of image data and a providing of zooming frames to display interface 26 for display (e.g., preview display). In this selectable mode, camera processor(s) 14 may proceed to retrieve the full FOV frames and apply zoom settings to the frames to generate a second set of frames that include zoom transitions distinct from the first set of frames. In some instances, however, camera processor(s) may perform such techniques of this disclosure without enablement of any selectable mode (e.g., by default). In any case, camera processor(s) 14 may generate a first set of frames representing a first set of zoom transitions, determine a second set of zoom transitions distinct from the first set of zoom transitions, and determine a second set of frames that is different from the first set of frames. The second set of frames may represent the second set of zoom transitions. In only some examples, camera processor(s) 14 may utilize a memory device, separate from memory of camera processor(s) 14, to perform such techniques, as disclosed herein.

In some examples, CPU 16 may receive user input indicating that a particular zoom level comprises a target zoom level. The target zoom level may represent a zoom level that the user originally desired for the video capture, but that the user may not have been able to expeditiously achieve upon performing various zoom operations, such as when performing coarse pinch-to-zoom operations. Although described with reference to CPU 16 as receiving user input, these inputs may also be received by other structures of computing device 10, including camera processor(s) 14, such as in instances where those structures are not integrated or combined to form a common chip. The various structures of computing device 10 may receive the user input, for example, from CPU 16, system memory 30, or user interface 22.

In some examples, camera processor(s) 14 or CPU 16 may receive, via user interface 22, an indication of a desired zoom level. For example, a user may utilize mechanisms of user interface 22 to determine a particular zoom level. Once the user determines the particular zoom level, the user may select a command indicating satisfaction of the user with a particular zoom level. Camera processor(s) 14 or CPU 16 may receive the command via user interface 22 as part of zoom settings 23. Camera processor(s) 14 may derive a second set of zoom settings from zoom settings 23 in order to determine the second set of frames in accordance with the second set of zoom settings. In such instances, camera processor(s) 14 may output the second set of frames, the second set of frames reflecting one or more zoom transitions that capture a target zoom level of the user. In an illustrative example, camera processor(s) 14 may receive a set of zoom settings 23 during a trial period, the trial period being a time when the user attempts to find the desired zoom level that best captures the scene the way the user desires. Camera processor(s) 14 may, in the background, store the full FOV frames such that camera processor(s) 14 may subsequently alter those frames based on the trial period and/or the desired zoom level.

In some examples, a first image sensor 12 corresponding to a first camera may be the same image sensor 12 that corresponds to a second camera. That is, image sensor 12 that corresponds to a second camera may be the same first image sensor that corresponds to the first camera. The first camera and the second camera may provide different effective focal lengths, for example, due to different lenses being used, the activation of moving prisms, etc. In some examples, camera processor(s) 14 may move lens 13A or lens 13B according to an autofocus process and/or in response to zoom settings 23 or second zoom settings derived from zoom settings 23. In performing the autofocus process or when applying the various zoom settings, camera processor(s) 14 may cause lens 13A to move in order to achieve a particular focal length. The autofocus process may include focusing and subsequent defocusing, or vice versa.

Display 28 may include a monitor, a television, a projection device, a liquid crystal display (LCD), a plasma display panel, a light emitting diode (LED) array, an organic LED (OLED), electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link. Display 28 may provide preview frames that a user may view to see what is being stored or what a picture might look like if camera 15 were to actually take a picture or start recording video.

In some examples, camera processor(s) 14 may receive a plurality of frames of image data (e.g., video data). For example, camera processor(s) 14 may receive a plurality of frames of the image data from one or more image sensor(s) 12. Camera processor(s) 14 may receive the frames as pixel data from the image sensor(s) 12. In an illustrative example, a 48 megapixel (MP) image sensor 12 may transfer, at full FOV potential, 48 million pixels to camera processor(s) 14. In some instances, image sensor 12 may transfer a reduced number of pixels relative to a number of pixels potentially available from the particular image sensor 12 (e.g., a reduced 12 MP output to camera processor 14 from a 48 MP image sensor 12). For example, image sensor(s) 12 may output fewer pixels instances where the image sensor(s) engage in various pixel binning techniques and/or when camera processor(s) 14 instruct image sensor(s) 12 to only transfer a particular portion of the pixel array of image sensor 12 (e.g., pixels corresponding to the center quarter of the pixel array of image sensor 12). In any event, camera processor(s) 14 may receive frames of image data from image sensor 12. For example, camera processor(s) 14 may receive multiple frames of image data from image sensor 12 that may collectively represent video data of a video recording.

In some instances, camera processor(s) 14 may initiate a video recording in response to user input via user interface 22 commanding a video recording. In another example, camera processor(s) 14 may record video automatically such as when camera processor(s) 14 detect a particular recording trigger that triggers camera processor(s) 14 to initiate a video recording.

In addition, camera processor(s) 14 may receive zoom settings 23 corresponding to the plurality of frames. In some examples, camera processor(s) 14 may receive, via user interface 22, a zoom setting for each frame of the plurality of frames received by image sensor(s) 12. In some examples, camera processor(s) 14 may receive a request to zoom-in to a particular zoom level. The camera processor(s) 14 may also receive requests to zoom-out to other zoom levels. In some instances, camera processor(s) 14 may receive a request to zoom-out in response to an over zoom, such as when the first zoom request represents a zoom that exceeds a threshold zoom. For example, a user may realize that the zoom has exceeded a particular undesired threshold and may initiate a zoom-out process in order to correct for the excess zoom. In any case, camera processor(s) 14 may receive zoom settings 23 in real-time as a user is recording video or preparing to record video and as such zoom settings 23 correspond to the frames as those frames are received by camera processor(s) 14. That is, the zoom changes over time correspond to the frames received over time.

According to zoom settings 23, camera processor(s) 14 may generate a first set of frames for preview (e.g., preview frames, zooming frames, actively zooming frames, etc.). In accordance with zoom settings 23, the first set of frames may represent a first set of zoom transitions. In an illustrative and non-limiting example, a first zoom transition may include a transition from 1.0× to 5.0× zoom, a subsequent zoom transition may include a transition from 5.0× to 11.0×, a next zoom transition may include a transition from 11.0× to 9.0×, and a final zoom transition may include a transition from 9.0× to 10.0× zoom. In such instances, camera processor(s) 14 may generate a first set of frames that reflect or represent the various zoom transitions. The zoom levels may be abrupt, gradual, or otherwise sensitive to varying control or movement defined by user interface input. In addition, various zoom levels may be applied for various periods of time. In an illustrative example, based on input received via user interface 22, camera processor(s) 14 may apply, in order to generate the first set of frames, the 5.0× zoom for 0.5 seconds before a first zoom transition and apply the 11.0× zoom for a different duration of time before another zoom transition. In any case, the first set of frames may reflect input received via user interface 22 in terms of the first set of zoom transitions.

In an illustrative example, the camera processor(s) 14 may determine and/or generate a first set of preview frames by receiving a plurality of FOV frames of image data from image sensor(s) 12 (e.g., a plurality of incoming frames). The camera processor(s) 14 may receive, from the image sensor(s) 12, full potential FOV frames of image data (e.g., frames of video data and/or preview data). In some instances, camera processor(s) 14 may receive less than the full potential FOV frames in cases where camera processor(s) 14 cause image sensor(s) 12 to output a reduced number of pixels (e.g., center 25% of the frame). In some examples, camera processor(s) 14 or image sensor(s) 12 may store the plurality of incoming frames to memory, where the plurality of incoming frames are stored prior to camera processor(s) 14 applying any zoom settings to the incoming frames. In such examples, the camera processor(s) may store the plurality of captured frames as having the full number of pixels received from a given image sensor 12 (e.g., full FOV frames).

In some examples, in order to implement zoom settings 23, camera processor(s) 14 may perform optical zoom techniques and/or digital zoom techniques, such as digital cropping, scaling, sampling, etc., on the received frames to generate a first set of frames for preview display and/or storage. Camera processor(s) 14 may be configured to output the first set of frames to display interface 26 or other display devices. In any case, the first set of frames may represent a first set of zoom transitions that are based on zoom settings (e.g., zoom commands) received from a user and/or provided by an AI algorithm or ML model.

In addition, camera processor(s) 14 may determine and/or generate a second set of frames. Camera processor(s) 14 may generate the second set of frames from at least a subset of the plurality of frames received from image sensor(s) 12 (e.g., the plurality of frames used to generate the first set of frames). The second set of frames may be different than the first set of frames. In one example, the second set of frames may differ from the first set of frames in that at least one frame from the second set of frames has a different zoom setting compared to a corresponding frame from the first set of frames.

In accordance with the different zoom setting, camera processor(s) 14 may determine and/or generate the second set of frames using optical zoom techniques, such as automatic lens actuations, and/or digital zoom techniques. In some examples, camera processor(s) 14 may digitally alter frames received from image sensor(s) 12 in order to determine and/or generate the second set of frames. In such examples, camera processor(s) 14 may digitally alter frames by digitally cropping and/or scaling pixels of the frames. In another example, camera processor(s) 14 may digitally alter frames by adapting pixel binning levels that image sensor(s) 12 may apply when outputting frames of image data to camera processor(s) 14.

In some instances, camera processor(s) 14 may determine the second set of frames based on only a subset of the frames received from image sensor(s) 12. For example, camera processor(s) 14 may generate a subset of the second set of frames by utilizing one or more corresponding frames from the first set of frames. That is, camera processor(s) 14, when determining frames of the second set of frames, may digitally alter one or more corresponding frames from the first set of frames in order to determine particular frames of the second set of frames. Camera processor(s) 14 may utilize such techniques in cases where pixel binning techniques are used that adapt to increasing or decreasing zoom levels. In general, image sensor(s) 12 perform pixel binning by combining multiple pixels of image sensor(s) 12 into fewer pixels for output to a camera processor (e.g., 4×4 binning, 3×3 binning, 2×2 binning, horizontal binning, vertical binning, etc.). Binning techniques improve the signal-to-noise ratio (SNR) by allowing image sensor(s) 12, or in some instances, camera processor(s) 14, to combine pixels together through various combination schemes, including averaging or summing multiple pixels together for each output pixel. Pursuant to such techniques, image sensor(s) 12 may output less pixels during binning level transitions and/or lens transitions. In such examples, among others, camera processor(s) 14 may utilize frames from the first set of frames, as received from image sensor 12, in order to supplement at least a subset of the second set of frames. In such examples, camera processor(s) 14 may determine, from at least a subset of the first set of frames, the second set of frames, where the second of frames are different than the first set of frames and represent one or more smoothed zoom transitions.

In examples involving determining a second set of zoom transitions, the second set of zoom transitions (e.g., smoothed zoom transitions) may be distinct from the first set of zoom transitions, either in terms of duration, rate of zoom, zoom levels, etc. For example, in keeping with the above illustrative example for generating the first set of frames, a set of smoothed zoom transitions may include a smooth transition from 1.0× to 10.0× without the brief stop at 5.0× and without the extraneous zoom levels before ultimately arriving at 10.0× zoom. In some instances, AI algorithms and/or ML models may define the differences between the first set of zoom transitions and the second set of zoom transitions. In another example, user input may define the differences, such as a user input indicating that 10.0× was actually the desired zoom level all along (e.g., a targeted zoom level). In such instances, camera processor(s) 14 and/or CPU 16 may augment the user input by executing certain AI algorithms and/or ML models, such as AI algorithms or ML models configured to identify objects in a frame (e.g., facial detection, person detection, building detection, etc.). The AI algorithms and/or ML models may be trained to determine a focus of the frames. That is, a user may have desired a particular object to be the actual focus of the entire zooming experience, in which case, the AI algorithms and/or ML models may identify the focus of the zooming experience based on a detection of the object in the plurality of incoming frames. As such, camera processor(s) 14 may include information regarding the identified focus of the frames in zoom settings 23. In such examples, camera processor(s) 14 may determine, based on such zoom settings 23, the second set of frames so as to represent a second set of zoom transitions that track onto the identified focus of the frames. In some instances, camera processor(s) 14 may perform selective digital cropping, such as by adjusting or tailoring a digital crop area relative to a frame (e.g., crop to capture pixels from a non-center portion of a frame). In this way, camera processor(s) 14 may, when determining the second set of frames, better track and more accurately implement the zoom settings (e.g., zoom commands, panning, panning while zooming, etc.).

In some examples, camera processor(s) 14 may output the second set of frames (e.g., a second set of zooming frames), where the second set of frames are different than the first set of frames. For example, camera processor(s) 14 may output the second set of frames to system memory 30 for storage, to video encoder/decoder 17 for video coding, to display interface 26 or display 28 for display, to local memory 20 or GPU 18 for graphics processing, etc. In some examples, camera processor(s) 14 may output the second set of frames for further internal processing.

In some examples, camera processor(s) 14 may output the second set of frames to memory controller 24 in order for the second set of frames to be stored as a video file. In some examples, CPU 16, video encoder/decoder 17, and/or camera processor 14 may output the second set of frames to be stored as a video file. In some examples, memory controller 24 may generate and/or store the second set of frames in any suitable video file format. In some examples, video encoder/decoder 17 may encode the second set of frames prior to CPU 16, video encoder/decoder 17, and/or camera processor 14 causing the second set of frames to be stored as an encoded video. Encoder/decoder 17 may encode frames of image data using various encoding techniques, including those described in standards defined by MPEG-2, MPEG-4, ITU-T H.263, ITU-T H.264/MPEG-4, Part 10, Advanced Video Coding (AVC), ITU-T H.265/High Efficiency Video Coding (HEVC), Versatile Video Coding (VCC), etc., and extensions thereof. In a non-limiting example, CPU 16, video encoder/decoder 17, and/or camera processor 14 may cause the second set of frames to be stored using a Moving Picture Experts Group (MPEG) video file format.

Figure 2:
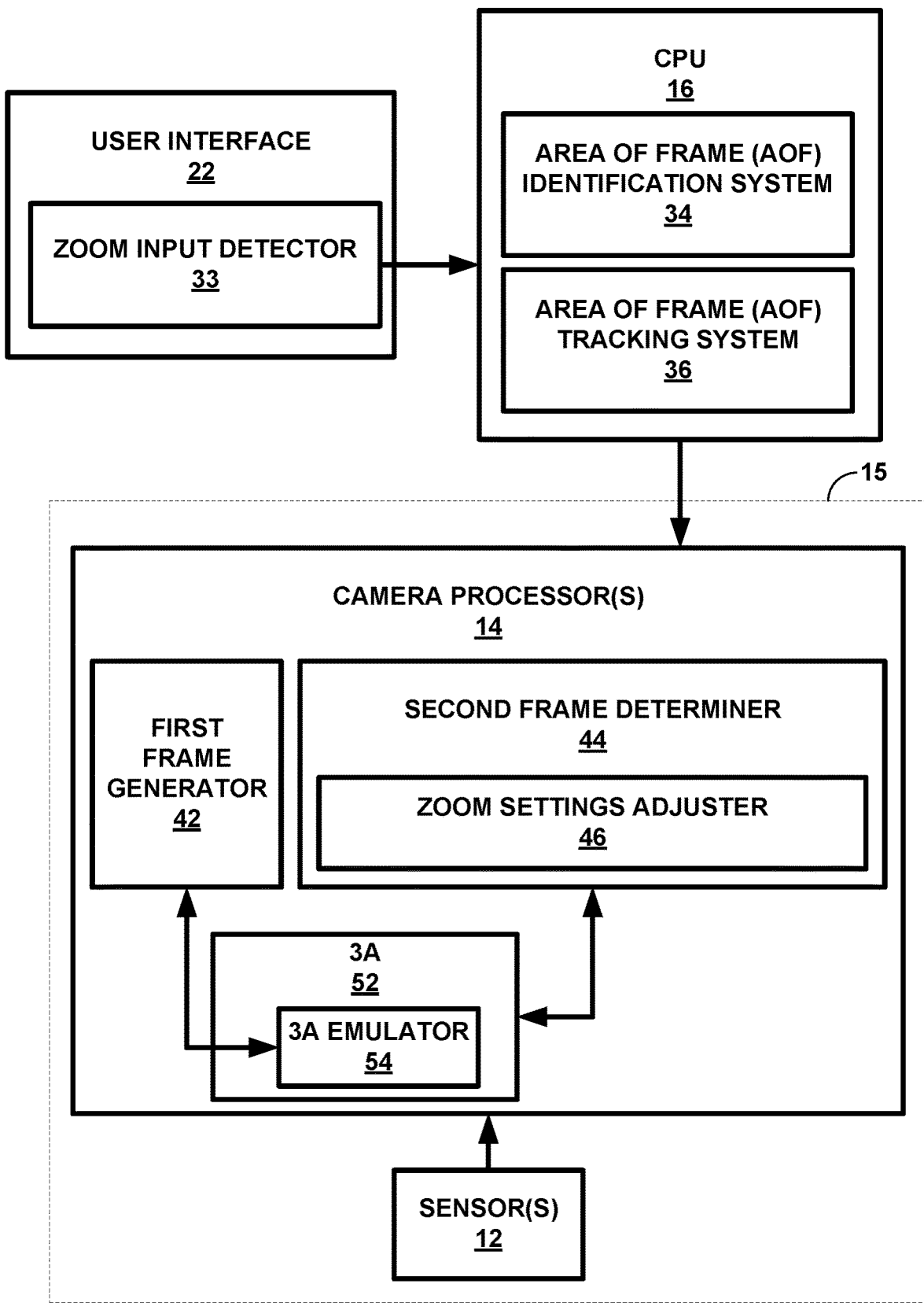
FIG. 2 is a block diagram illustrating example components of an example camera, in accordance with various aspects of the techniques described in this disclosure.

FIG. 2 is a block diagram illustrating example components of computing device 10, including camera processor(s) 14, user interface 22, and CPU 16, in accordance with various aspects of the techniques described in this disclosure. As shown in FIG. 2, user interface 22 may include a zoom input detector 33. Zoom input detector 33 may detect user input, such as touch input (e.g., taps, pinch, slide, etc.), gestures (e.g., voice gestures, hand gestures, head gestures, gaze gestures, etc.), actuation of one of lenses 13, etc. Zoom input detector 33 may convey the zoom input to CPU 16 or to camera processor(s) 14. CPU 16 or camera processor(s) 14 may determine zoom settings 23 from the detected zoom input.

In some examples, CPU 16 may include an area of frame (AOF) identification system 34 and/or an AOF tracking system 36. In some examples, camera processor(s) 14 may include AOF identification system 34 and/or AOF tracking system 36. In any event, AOF identification system 34 may identify particular areas of a frame, such as areas including objects, people, faces, regions, etc. In a non-limiting example, AOF identification system 34 may include a facial detection system. In some examples, AOF identification system 34 may receive user input via user interface 22 that assists AOF identification system 34 in identifying particular areas of the frame. For example, a user may provide touch input on a touch screen indicating a person in a frame or other areas of the frame. In any case, AOF identification system 34 may utilize AI algorithms and/or ML models to identify various areas of the frame (e.g., areas corresponding to people, buildings, etc.) and to assist with tracking of the areas of the frame.

AOF tracking system 36 may track identified areas of the frames from a first frame to subsequent frames, such as to track an object, person, or face during a video capture. The AOF identification system 34 and/or AOF tracking system 36 may generate AOF information including the location of various areas of the frame that include object, movement prediction of the object, etc. In some examples, camera processor(s) 14 or CPU 16 may utilize the AOF information in order to determine the second set of frames. That is, camera processor(s) 14 or CPU 16 may utilize the AOF information to derive a second set of zoom settings and determine the second set of frames according to the second set of zoom settings. In one example, zoom settings adjuster 46 may derive the second set of zoom settings based on the AOF information.

In an illustrative and non-limiting example, facial detection techniques may indicate that a user is attempting to zoom in on a person (e.g., the focus of the zoom). In such examples, the second set of frames may represent zoom settings configured to focus on the person in the frame, such as for dynamically zooming frames or for statically zoomed frames. In one example, the second set of frames may represent a second set of zoom transitions configured to focus on the person in the frame. In such examples, the second set of zoom transitions may differ from a first set of zoom transitions represented by a set of corresponding preview frames.

In addition, camera processor(s) 14 may, in some examples, include 3A processing engine 52. For example, camera processor(s) 14 may be configured to execute various 3A algorithms on frames of image data via processing engine 52. In some examples, camera processor(s) 14 may determine, via 3A processing engine 52, a set of automatic parameters for an image capture. For example, camera processor(s) 14 may determine a set of automatic adjustment parameters based on conditions of the image capture (e.g., lighting conditions, the presence of certain areas of the frame that trigger autofocusing, etc.). The automatic adjustment parameters may include 3A parameters or settings, such as auto-focus, auto-exposure, and/or auto-white-balance parameters or settings. In any case, 3A processing engine 52 may generate the set of automatic adjustment parameters (e.g., 3A settings) and output, for further processing, the set of automatic adjustment parameters. For example, 3A processing engine 52 may output the set of automatic adjustment parameters to camera processor(s) 14 or CPU 16. Camera processor(s) 14, or in some instances, CPU 16, may apply the set of automatic adjustment parameters to particular frames of image data.

In some examples, camera processor(s) 14 may apply a first set of automatic adjustment parameters to the plurality of frames received from one or more of image sensors 12 (e.g., the plurality of captured frames). The automatic adjustment parameters may include 3A parameters. Camera processor(s) 14 may apply the first set of automatic adjustment parameters to the plurality of frames prior to outputting the plurality of frames. In some examples, camera processor(s) 14 may output the plurality of frames of image data to display interface 26, to system memory 30, to a second one of camera processor(s) 14, etc.

In addition, camera processor(s) 14 may determine, from the plurality of frames, a first set of frames. As such, camera processor(s) 14 may apply a second set of automatic adjustment parameters to the first set of frames. In some examples, the second set of automatic adjustment parameters is the same as the first set of automatic adjustment parameters. In an illustrative example, 3A engine 52 of camera processor(s) 14 may apply 3A settings to the plurality of full potential FOV frames received from image sensor(s) 12 and may apply the same 3A settings to the first set of frames slated for preview display. In such instances, the first set of displayed frames in preview may not comprise 3A settings that are based on the FOV represented by the first set of preview frames, but may instead comprise 3A settings based on the full scene as captured by all available pixels of image sensor 12 (e.g., all pixels or a reduced number of pixels, in some instances). In some examples, the plurality of frames may not comprise 3A settings that correspond to the full FOV scene as captured by image sensor(s) 12, but may instead comprise 3A settings based on the FOV represented by the first set of preview frames.

In some examples, camera processor(s) 14 may determine the second set of automatic adjustment parameters so as to be different from the first set of automatic adjustment parameters. For example, camera processor(s) 14 may include a 3A emulator 54 that emulates a set of automatic adjustment parameters. The emulated set of automatic adjustment parameters may be emulated specifically for the first set of frames (e.g., preview frames), such that, as previewed on display 28, the preview frames may represent the emulated set of 3A settings that are based on a different field of view of the first set of zooming frames. That is, the emulated 3A settings from 3A emulator 54 may respond to the changing zoom levels in real-time or near real-time, whereas the 3A settings from 3A engine 52 applied to the plurality of received frames may not be based on zoom settings because at least a subset of the plurality of received frames represents a static FOV. In some instances, a static FOV of the plurality of received frames may adjust to a second FOV, such as when zoom levels exceed pixel binning transition thresholds and/or lens transitions thresholds.

Camera processor(s) 14 may determine the second set of automatic adjustment parameters based on conditions of the first set of frames, such as whether the first set of frames represent a zooming into or out of an area of a scene. In an illustrative example, a zoomed-in area of a scene may have diminishing lighting conditions, objects in the frame for autofocusing, etc. A first frame generator 42 may be configured to utilize the 3A information from 3A emulator 54 to generate the first set of frames, such as for preview display. That is, camera processor(s) 14 may output, for display, the first set of frames as a set of preview frames, the preview frames representing the emulated set of automatic adjustment parameters. In some examples, camera processor(s) 14 may cause display interface 26 to display the first set of frames as preview frames. As described herein, camera processor(s) 14 may output, for a single display, the plurality of received frames representing the first set of automatic adjustment parameters and the first set of frames representing the second set of automatic adjustment parameters (e.g., picture-in-picture, side-by-side, etc.). In some examples, camera processor(s) 14 may cause display interface 26 to synchronize, in a single display, the plurality of received frames and the first set of frames, where the plurality of received frames and the first set of frames differ from one another.

In some examples, a second frame determiner 44 may utilize 3A information from 3A 52 and/or from 3A emulator 54 to determine the second set of frames. In such examples, zoom settings adjuster 46 may be configured to adjust zoom settings 23 based on input received from CPU 16 and/or zoom input detector 33. Zoom settings adjuster 46 may be configured to adjust, modify, optimize, or otherwise adjust zoom settings that are slated for use by second frame determiner 44 (e.g., to generate the second set of frames). In addition, zoom settings adjuster 46 may be configured to calculate zoom transitions based on zoom settings 23.

In addition, second frame determiner 44 and 3A 52 may determine a third set of 3A parameters for the second set of frames. That is, when generating the second set of frames, 3A emulator 54 may determine automatic adjustment parameters based on both the second set of automatic adjustment parameters used to generate the first set of frames and the first set of automatic adjustment parameters determined for the plurality of full FOV frames received from image sensor(s) 12. Second frame determiner 44 may combine the 3A parameters (e.g., average) based on the relative differences between the respective zoom settings. In one example, second frame determiner 44 may calculate a difference between a first set of zoom transitions represented by the first set of frames and a second set of zoom transitions represented by the second set of frames. In another example, second frame determiner 44 may calculate a set of differences relative to a first set of zoom settings represented by the first set of frames and a second set of zoom settings represented by the second set of frames. In any event, second frame determiner 44 may determine and/or generate the second set of frames to have automatic adjustment parameters that correspond to the zoom transitions smoothed by zoom settings adjuster 46. In some examples, zoom settings adjuster 46 may determine, based at least in part on the first set of zoom settings, a second set of zoom settings that represents adjustment from the first set of zoom settings. As such, second frame determiner 44 may determine and/or generate the second set of frames to represent automatic adjustment parameters that correspond to the second set of zoom settings. In an example, when generating the second set of frames, camera processor(s) 14 may apply the automatic adjustment parameters to the determined second set of frames to generate the second set of frames for display, encoding, and/or storage.

In some examples, camera processor(s) 14 may advantageously repurpose 3A settings used for the first set of frames when determining the second set of frames, and vice versa. In some examples, camera processor(s) 14 may be configured to apply dual 3A settings to distinct sets of frames. This can provide processing advantages in the generation of smooth zooming frames (e.g., the second set of frames) because the 3A settings may be applied smoothly and evenly to the smooth zooming frames. That is, in examples where the same 3A setting used for the second set of frames is used for the first set of preview frames, camera processor(s) 14 may avoid the burden of determining rapidly changing 3A settings that camera processor(s) 14 may otherwise encounter when rapidly reading pixel data, determining lighting conditions, etc. That is, camera processor(s) 14 can attempt to respond to coarse or abrupt zoom transitions defined by a user while simultaneously and dynamically attempting to apply 3A settings to a first set of preview frames. In accordance with techniques of this disclosure, however, camera processor(s) 14 may advantageously determine, or even predict, the third set of 3A settings for each frame of the second set of frames based on zoom settings represented by the second set of frames (e.g., zoom setting statistics, zoom transition statistics, a rate-of-zoom, etc.).

Figure 3:
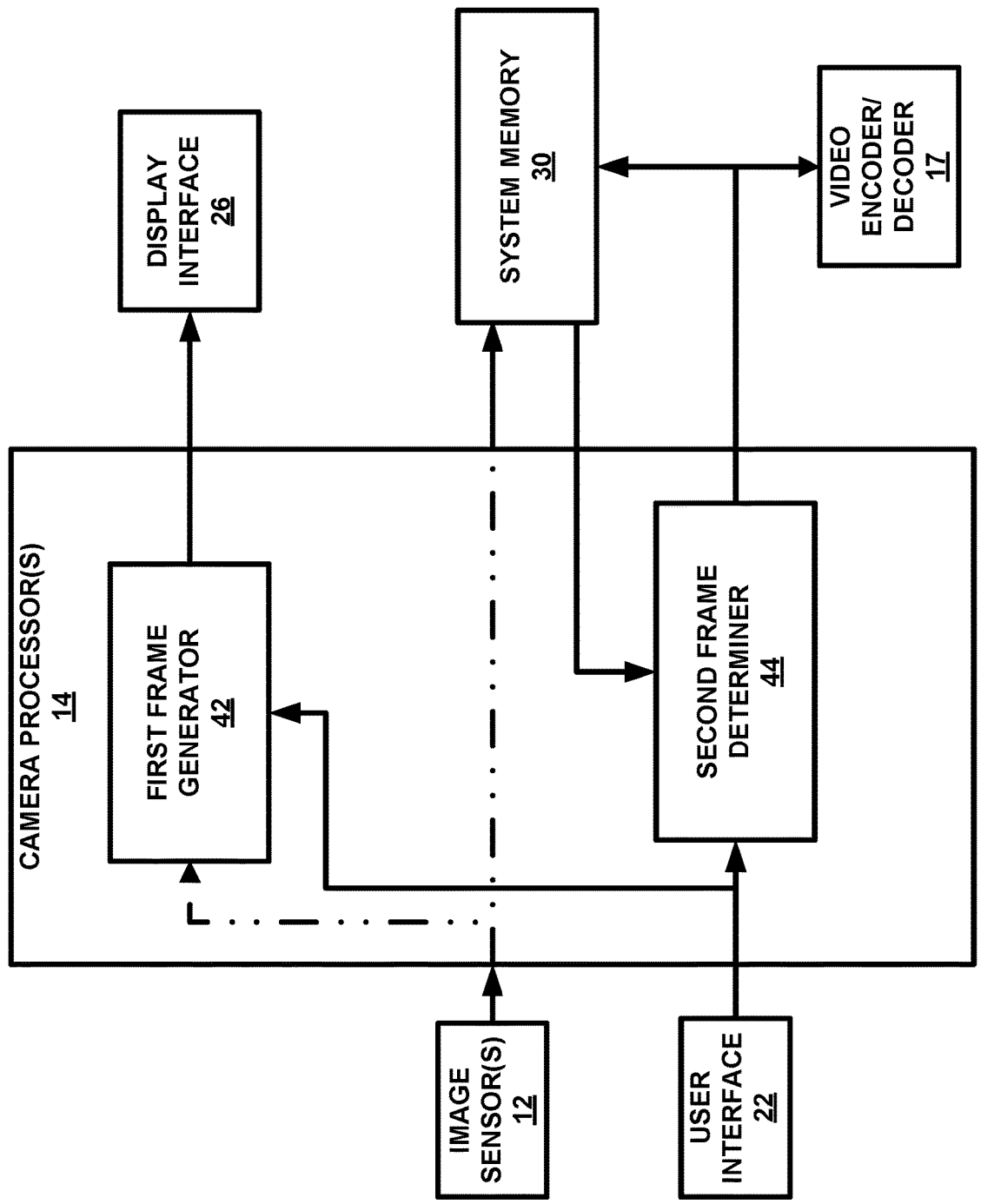
FIG. 3 is a block diagram illustrating example processing techniques of the camera processor(s) shown in FIG. 1 or 2.

FIG. 3 is a block diagram illustrating example processing of camera processor(s) 14, in accordance with various aspects of the techniques described in this disclosure. As shown, camera processor(s) 14 may receive user input via user interface 22. In some examples, first frame generator 42 may receive the user input. In addition, second frame determiner 44 may determine the user input via user interface 22 or first frame generator 42. As described herein, camera processor(s) 14 may determine zoom settings 23 that are based on the user input. In determining zoom settings 23, camera processor(s) 14 may, in some examples, retrieve zoom settings 23 from system memory 30. In such examples, a user or AI may have previously stored zoom settings 23 to system memory 30. In one example, an AI may have stored zoom settings 23 in the form of a predictive zoom program. In such instances, zoom settings adjuster 46 may dynamically adjust such zoom settings 23, for example, based on the user input. In a similar fashion, camera processor(s) 14 may deploy AI engines and/or ML models to determine zoom settings 23 that are tailored to particular users. The AI or ML engines may be trained on various inputs, such as a zoom command history of the user, user preferences, object identification tendencies of the user, etc.

As shown, image sensor(s) 12 may transfer a plurality of frames of image data to camera processor(s) 14. First frame generator 42 may receive the plurality of frames of image data from image sensor(s) 12. First frame generator 42 may apply zoom settings 23 (e.g., emulated 3A settings, etc.) to the plurality of frames in order to determine and/or generate the first set of preview frames. First frame generator 42 may output the first set of frames to display interface 26 for display via display 28. In some examples, first frame generator 42 may output the first set of frames to system memory 30, and/or local memory 20, for storage. In any case, first frame generator 42 may output the first set of frames for preview display. In such examples, the preview frames may be systematically discarded during or following the determination and/or generation of the second set of frames, as described herein.

In addition, camera processor(s) 14 may store the plurality of frames as full FOV frames received from image sensor(s) 12. Camera processor(s) 14 may cause the plurality of frames to be stored, to system memory 30, as comprising a full potential FOV. In general, a full potential FOV may correspond to the particular image sensor(s) 12 configured to capture the plurality of frames. In some instances, the full potential FOV may correspond to a reduced portion of the FOV, such as where camera processor(s) 14 instruct image sensor(s) 12 to output a reduced FOV or a reduced number of pixels. In some instances, camera processor(s) 14 may perform some processing on the frames prior to transferring the frames to system memory 30. For example, camera processor(s) 14 may apply automatic adjustment parameters (e.g., 3A settings) to the frames prior to storage in system memory 30. As such, second frame determiner 44 may receive the zoom settings 23 and receive the full FOV frames from system memory 30. Second frame determiner 44 may generate a second set of frames that is different from the preview display frames generated by first frame generator 42. Second frame determiner 44 may output the second set of frames to system memory 30 or in some instances, directly to video encoder/decoder 17. In some examples, second frame determiner 44 may output the second set of frames to local memory 20 and/or to display interface 26.

Camera processor(s) 14 may advantageously decouple frames slated for display from frames slated for storage or encoding. This provides camera processor(s) 14 with enhanced image and video capture options without increasing the burden placed on image sensor(s) 12, such as by maintaining processing and/or bandwidth consumption. That is, image sensor(s) 12 may still transfer one set of frames to camera processor(s) 14 (i.e., the plurality of captured frames). Camera processor(s) 14 may then optimally utilize the one set of frames to ultimately generate a final set of video frames (e.g., the second set of frames), where the final set is distinct from both the preview frames and the plurality of frames received from image sensor(s) 12. This configuration, among others disclosed herein, provides camera processor(s) 14 with advantages in camera processing over other processors that tend to couple preview frames displayed to the user with frames stored during a video recording or video coding process. In addition, camera processor(s) 14 are configured to apply zoom settings that are different from one another to corresponding sets of frames of image data so as to determine a smooth zooming second set of frames.

With reference to FIGS. 2 and 3, it should be noted that although first frame generator 42 and second frame determiner 44 are shown as two separate objects, this is mainly for illustration purposes, and first frame generator 42 and the second frame determiner 44 may, in some instances, be employed by the same camera processor(s) 14 as a single processing unit. It will be understood that first frame generator 42 is shown to illustrate the determination and/or generation of a first set of frames and second frame determiner 44 is shown to illustrate the determination and/or generation of a second set of frames. Both sets of frames may, in some cases, be handled by the same generation and/or determination process of camera processor(s) 14. Likewise, camera processor(s) 14 may also implement the functionality of zoom settings adjuster 46 in order to determine a second set of frames distinct from the first set of frames.

In some examples, camera processor(s) 14 may include dedicated camera processor memory, such as memory on a camera processing chip or buffer memory. That is, the techniques of this disclosure may be performed with or without the involvement of separate memory devices, such as system memory 30.

With reference to FIG. 3, camera processor(s) 14 may include a first camera processor 14 and a second camera processor 14. In such examples, the camera processor(s) 14 may nonetheless be implemented by a single camera processing chip. In any case, first camera processor 14 and/or second camera processor 14 may include on-chip memory, in some examples. The first camera processor 14 or the second camera processor 14 may receive the plurality of frames from image sensor(s) 12. In another example, the first camera processor 14 may receive the plurality of frames from image sensor(s) 12 and the second camera processor 14 may receive the plurality of frames from the first camera processor 14. In such examples, camera processor 14 may or may not perform pre-processing of the plurality of frames prior to transferring the plurality of frames to second camera processor 14.

In some examples, first camera processor 14 may include first frame generator 42. In addition, second camera processor 14 may include second frame determiner 44. Similar to examples where first frame generator 42 and second frame determiner 44 are implemented by camera processor(s) 14 within a single unit, second frame determiner 44 of second camera processor 14 may be configured to determine, based on zoom settings 23, a second set of frames that differs from the first set of frames. In some examples, the second frame determiner 44 of second camera processor 14 may be further configured to identify, based on zoom settings 23, one or more targeted zoom levels, and determine, based at least in part on the one or more targeted zoom levels, the second set of frames that is different than the first set of frames. In some examples, the second frame determiner 44 of second camera processor 14 to determine a second set of zoom transitions that are based at least in part on one or more target zoom levels. As described herein, camera processor(s) 14 (e.g., second camera processor 14) may determine the second set of zoom transitions such that the second set of zoom transitions is different than the first set of zoom transitions, as informed by the target zoom levels.

Figure 4:
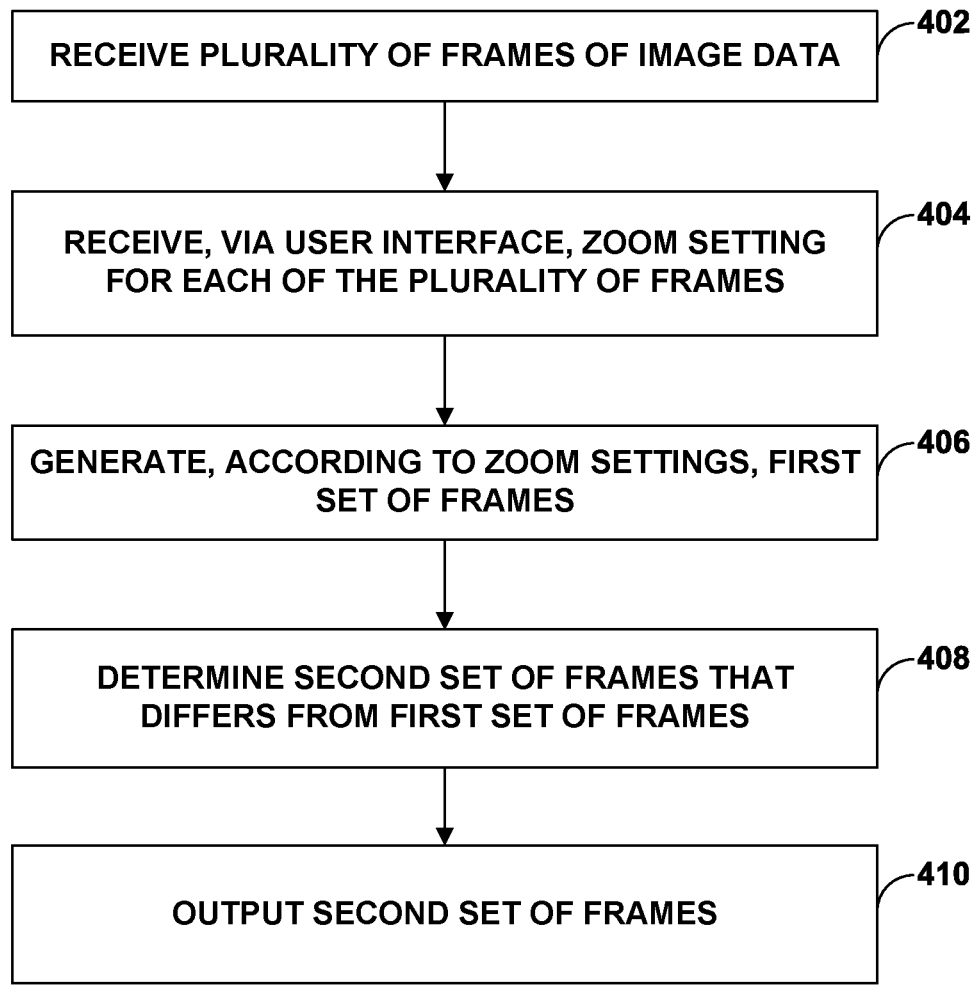
FIG. 4 is a flow diagram illustrating example operations of the example camera processor shown in FIG. 1, in accordance with various aspects of the techniques described in this disclosure.

FIG. 4 is an example flow diagram illustrating example operations of camera processor(s) 14, in accordance with various aspects of the techniques described in this disclosure. In some examples, the flow diagram of FIG. 1 may be performed by camera processor(s) 14 in communication with system memory 30. In such examples, camera processor(s) 14 may cause system memory 30 to store video data or other image data.

In some examples, camera processor(s) 14 may receive a plurality of frames of the image data (402). For example, image sensor(s) 12 may capture frames of image data and transfer the frames of image data to camera processor(s) 14, such as to both first frame generator 42 and second frame determiner 44. In some examples, camera processor(s) 14 may cause system memory 30 to store the frames of image data to memory (e.g., see straight dashed line from image sensor(s) 12 to system memory 30 in FIG. 3). In such instances, the plurality of frames being stored may have a full FOV that corresponds to one or more of image sensor(s) 12 configured to capture the plurality of frames. For example, a first image sensor may be a 48MP image sensor, in which case the first image sensor is configured to transfer 48 million pixels to camera processor(s) 14, assuming no pixel binning is used. In such instances, the full FOV corresponds to the full number of 48 million pixels of the respective image sensor 12. In addition, camera processor(s) 14 may output, to video encoder/decoder 17, the plurality of frames. In such instances, the plurality of frames may be encoded to have the full FOV that corresponds to one or more of image sensor(s) 12 configured to capture the plurality of frames. Video encoder/decoder 17 may output the encoded frames to system memory 30, to display 28, or to another separate computing device.

In some examples, system memory 30 may store the plurality of received frames at a uniform zoom level. For example, the plurality of received frames may be stored at 1.0× zoom for each of the frames, regardless of any user input actively commanding zoom settings 23.

In some examples, camera processor(s) 14 may receive, via user interface 22, zoom settings 23 corresponding to the plurality of received frames. That is, camera processor(s) 14 may receive a zoom setting for each of the plurality of frames (404). Zoom settings 23 may include digital zoom settings, optical zoom settings, combinations of optical and digital zoom settings, etc. In some examples, zoom settings 23 may correspond to lens actuation commands, gestures, gaze tracking commands, etc. In another example, zoom settings 23 may include zoom level inputs, zoom transition inputs, etc. In any case, zoom settings 23 may apply to digital zooms and/or optical zooms achieved by camera 15.

In addition, camera processor(s) 14 may determine or generate, according to the zoom settings 23, a first set of frames (406). In some examples, the first set of frames represents a first set of zoom transitions. For example, a first zoom transition may be from 1.0× to 5.0×. In some examples, camera 15 may be configured to perform a lens transition at particular zoom thresholds. For example, camera 15 may be configured to perform a lens transition at a 5.0× zoom threshold. In addition, in some instances, a user interface command may result in an instant zoom transition from one zoom level to another zoom level. In an illustrative example, actuation of a soft key icon may result in an instant zoom from 1.0× to 5.0×. That is, camera processor(s) may perform such transitions upon receiving a command corresponding to a user selecting, via user interface 22, a 5.0× zoom icon. In such instances, camera processor(s) 14 may perform a single zoom change (e.g., transitioning from lens 13A to 13B) without performing digital cropping, scaling, etc., in order to achieve the zoom setting. That is, the zoom setting represents the commanded zoom of 5.0× zoom in this example. When determining the second set of frames as described herein, camera processor(s) 14 may be configured to smooth the zoom transition from 1.0× to 5.0×, such that the transition is gradual rather than instantaneous. Camera processor(s) 14 may do so by employing a combination of optical zoom techniques and digital zoom techniques. In another example, such zoom settings may represent multiple zoom transitions. In some examples, the first set of frames may include a digitally altered set of frames representing a first set of zoom transitions, a non-digitally altered set of frames representing the first set of zoom transitions, or a combination thereof. In some examples, camera processor(s) 14 may when generating the first set of frames, determine the first set of frames such that the first set of frames is represented by a first set of zoom settings (e.g., a first set of zoom transitions).

In an example involving one zoom transition, the one zoom transition could be from a default/initial zoom level (e.g., 1.0×) to a second zoom level (e.g., 5.0×), where the user selects a 5.0× zoom icon on user interface 22. In some instances, the user may need to move camera 15 to re-center the image after the abrupt zoom to 5.0×. In any case, the user may desire an end-video that has a steady zoom from 1.0× to 5.0× that zooms steadily in toward an object of interest to the user. The rate of the zoom may be predefined by the user or may include a variable or non-uniform rate as the final zoom level is achieved (e.g., a 5.0× zoom level). That is, AI algorithms and/or ML models may determine an adjusted zoom setting to include a particular zoom rate. In one example, the rate may be based on user preferences, context of the scene capture, or past zoom history. In some examples, the particular AI algorithms and/or ML models may be trained on user preferences, context of the scene capture, past zoom history, etc.

In some examples, camera processor(s) 14 may determine a second set of frames (408). In such examples, the second set of frames is different than the first set of frames. Camera processor(s) 14 may determine the second set of frames based on zoom settings 23. As described herein, camera processor(s) 14 may determine the second set of frames based on a second set of adjusted zoom settings. In addition, the second set of frames may represent a second set of zoom transitions. In such examples, the second set of zoom transitions is distinct from the first set of zoom transitions represented by a first set of frames (e.g., the first set of preview frames). In some examples, camera processor(s) 14 may determine a specification for generating the second set of frames. The specification may include adjusted zoom settings, identifiers of corresponding frames from the plurality of frames, identifiers of corresponding frames from the first set of frames, corresponding frame data from one or more of the corresponding frames, etc. In some instances, camera processor(s) 14 may determine and generate the second set of frames according to the specification. In some examples, camera processor(s) 14 may generate the second set of frames from at least a subset of the plurality of captured frames. As such, camera processor(s) 14 may, in determining the second set of frames, generate the second set of frames.

In some examples, the second set of frames may include static zooms, dynamic zooms, or combinations of static and dynamic zooms, as described herein. In an illustrative example, the second set of frames may include a refined zoom transition that automatically causes a first zoom level applied to an initial frame of video data and maintains the first zoom level over multiple frames of the second set of frames. The first zoom level may be different from a default zoom level and distinct from an initial zoom level represented by the first set of zoom transitions. In addition, the first zoom level may be based on a target zoom level identified from the zoom settings or as otherwise, defined by one or more zoom commands. In some examples, the second set of frames may include a static zoom that starts with a target zoom level and applies the same zoom level to multiple frames starting with frame N, where frame N may include an initial frame of video data. The second set of frames may further include dynamically zooming frames that follow the static zoom or precede the static zoom. A person skilled in the art will understand that other permutations may exist in keeping with the spirit of this disclosure, and for the sake of brevity, not every example may be described here.

In some examples, the second set of zoom transitions may include smoothed zoom transitions, or otherwise altered zoom transitions, between zoom levels, and in some instances, may include altered zoom transitions that remove certain zoom transitions altogether that were included with the first set of frames. In some examples, the camera processor(s) may use digital zoom techniques and/or optical zoom techniques to determine the second set of frames that differs from the first set of frames.

In some examples, camera processor(s) 14 may detect a particular zoom level applied to a particular number of frames that exceeds a threshold or exceeds an amount relative to the number of frames corresponding to previous intermediate zoom levels. Such a prolonged application of zoom levels indicates that the zoom level is ultimately what a user desired. In such instances, camera processor(s) 14 may identify the particular zoom level input as a target zoom level. In some examples, camera processor(s) 14 may identify multiple target zoom levels based on the zoom commands. For example, a first desired zoom level may be at 50.0× that camera processor(s) 14 maintain for a particular number of frames or for a particular duration of time and a second desired zoom level may be at 100.0×. In such instances, camera processor(s) 14 may maintain the first desired zoom level and may automatically switch to the second desired zoom level after a particular number of frames or for a particular duration of time. In some examples, camera processor(s) 14 may gradually transition from the first desired zoom level to the second desired zoom level. In any case, camera processor(s) 14 may maintain focus of the zooming frames on an object of interest or a particular of the frame of interest as identified by the user, detection AI algorithms, ML models, etc. In some instances, a target or desired zoom level may represent an AI-determined or AI-desired zoom level.

In some examples, camera processor(s) 14 may determine, based at least in part on the one or more target zoom levels, a second set of zoom transitions that are distinct from the first set of zoom transition. In an illustrative example, zoom settings 23 may include a zoom rate (e.g., slow zoom, fast zoom), digital cropping amount, adjustment to coordinates of digitally cropped portions, such as when a user moves camera 15 or pans across a scene to re-center a detected object in the frame. In such examples, the user may attempt to zoom-in on an object in the scene but may over zoom and need to simultaneously zoom-out and move the camera 15 to point in a different direction at the object. In such instances, zoom settings adjuster 46 may adjust zoom settings 23 based on the zoom input and movement of the object relative to the frames as detected by AOF tracking system 36. In some examples, the second set of zoom transitions may include at least one optical zoom transition. The optical zoom transition may include zooming-in to a target zoom level from the identified target zoom levels via an optical zoom. In any case, camera processor(s) 14 may retrieve frames from the plurality of frames directly from the input of the image sensor(s) 12.

In some examples, camera processor(s) 14 may generate the second set of zooming frames from a subset of the plurality of frames. For example, camera processor(s) 14 may generate a first subset of the second set of frames from the plurality of frames received from image sensor(s) 12 and generate a second subset of the second set of frames from frames of the first set of frames. In another example, camera processor(s) 14 may generate the second set of frames entirely from the plurality of frames received from image sensor(s) 12. In any case, camera processor(s) 14 may generate the second set of frames by performing optical zoom techniques and/or digital zoom techniques. In some examples, camera processor(s) 14 may generate the second set of frames by digitally cropping, scaling, or digitally cropping and scaling the one or more frames received from image sensor 12. For example, camera processor(s) 14 may crop a frame, based on the zoom settings (e.g., a target zoom level), in order to generate a corresponding frame for the second set of frames. In some examples, camera processor(s) 14 may generate the second set of frames based on digitally altered frames that were previously altered as a result of adapting pixel binning levels as implemented by image sensor(s) 12. In another example, camera processor(s) 14 may generate the second set of frames by causing an optical zoom level adjustment based on one or more target zoom levels (e.g., desired zoom levels). In some examples, camera processor(s) 14 may receive, via user interface 22, an optical zoom command. Camera processor(s) 14 may identify one or more of the optical zoom levels defined by the optical zoom command as comprising one or more target zoom levels. Camera processor(s) 14 may generate the second set of frames based on the one or more target zoom levels. In such examples, camera processor(s) 14 may further generate the second set of frames by digitally altering at least a subset of the plurality of frames received from image sensor(s) 12 or by digitally altering at least a subset of the first set of frames output from first frame generator 42.

In an illustrative example, camera processor(s) 14 may generate the second set of frames based at least in part on a subset of the first set of frames. In some examples, the second set of frames may represent digitally-altered frames. Camera processor(s) 14 may reuse some frames from the first set of frames slated for preview display when recreating video frames having the second set of zoom transitions (e.g., modified zoom transitions). Camera processor(s) 14 may do this where there is an overlap between frames and zoom levels, such that camera processor(s) 14 determine that, instead of recreating additional zooming frames at particular zoom levels, camera processor(s) 14 may advantageously reuse or repurpose frames previously generated for the first set of frames when generating the second set of frames. That is, camera processor(s) 14 may advantageously reuse particular frames from the first set of frames in order to generate the second set of frames. Camera processor(s) 14 may, however, not repurpose any of the frames from the first set of frames and still determine or generate the second set of frames.

As described herein, when determining and/or generating the second set of frames, camera processor(s) 14 may perform a detection of an area of a frame (e.g., an object, region, etc.). For example, AOF identification system 34 may detect particular areas of a frame that are candidates for autofocus techniques. In such examples, the second set of zooming frames is generated based at least in part on the detection. For example, the digital cropping and/or smooth zoom may be performed such that the identified areas remain as the focus of the second set of frames. For example, the identified areas may remain at or proximate a center region of the second set of frames.

In some examples, camera processor(s) 14 may output the second set of frames (410). In such examples, camera processor(s) 14 may output the second set of frames (e.g., smooth zooming frames) for further internal processing. In some examples, camera processor(s) 14 may output the second set of frames for external processing relative to camera processor(s) 14 or to display interface 26 for display. In one example, camera processor(s) 14 may output the second set of frames to video encoder/decoder 17, to system memory 30, and/or to display interface 26. That is, when outputting the second set of frames, camera processor(s) 14 may be configured to output the second set of frames to at least one of video encoder/decoder 17, system memory 30, and/or display interface 26 (e.g., display 28). In some instances, the output of the second set of frames may include instructions for generating the second set of frames. The instructions may include zoom settings, 3A settings, etc. In any case, the instructions may represent that at least one frame from the second set of frames comprises a different zoom setting than a corresponding frame from the first set of frames. In another example, the output of the second set of frames may include a second generated set of frames, where camera processor(s) 14 generate, based on adjusted zoom settings, the second set of frames. In some examples, video encoder/decoder 17 may generate the second set of frames.

In some examples, to determine the second set of frames, camera processor(s) 14 may proceed to generate the second set of frames from at least a subset of the plurality of frames received from image sensor(s) 12. In another example, camera processor(s) 14 may determine the second set of frames and output the second set of frames, for example, to video encoder/decoder 17. In such examples, video encoder/decoder 17 may generate the second set of frames. In any case, at least one frame from the second set of frames may have a zoom setting that is different from a corresponding zoom setting utilized for the first set of frames.

In some examples, camera processor(s) 14 may output, for further processing, the second set of zoom transitions. In some examples, zoom settings adjuster 46 may determine the second set of transitions. As such, zoom settings adjuster 46 may output the second set of zoom transitions to second frame determiner 44. Second frame determiner 44 may determine the second set of frames such that the second set of frames represent the second set of zoom transitions. The zoom transitions may be output as a set of zoom settings that define how the second set of frames should zoom-in on or zoom-out from a scene. In some examples, camera processor(s) 14 may output the second set of zoom transitions to system memory 30, such as to a memory buffer of one of camera processor(s) 14 or other on-chip memory. In another example, camera processor(s) 14 may output the second set of zoom transitions to video encoder/decoder 17.

In some examples, camera processor(s) 14 may cause the memory device, such as system memory 30 to initiate a storing of the second set of frames. In such examples, camera processor(s) may, subsequent to the initiation of the storing of the second set of frames, cause system memory to initiate a modification of the plurality of received frames that, in such examples, are stored in the memory device. For example, camera processor(s) 14 may store the second set of frames in real-time as the plurality of full FOV frames are modified. In some examples, camera processor(s) 14 may generate a first frame of the second set of frames and subsequently delete, from memory, a corresponding frame of the plurality of frames.

In some example, the modification of the plurality of frames of the image data from the memory device includes removing the plurality of frames from the memory device. For example, camera processor(s) 14 may cause system memory 30 to delete the plurality of frames from memory. In another example, camera processor(s) 14 may cause system memory 30 to relocate the plurality of frames to a separate file directory. For example, camera processor(s) 14 may cause system memory 30 to relocate the plurality of frames to a file directory that is configured to delete data items or the entire contents of the file directory after the frames of image data have been in the file directory for a predefined amount of time (e.g., 1 hour, 1 day, 30 days, etc.).

In some examples, camera processor(s) 14 may be configured to receive, via user interface 22, selection of a particular camera mode (e.g., a selectable zoom mode). That is, camera processor(s) 14 may be configured to operate according to an enabled camera mode. In some examples, a user may select or enable an option or mode that triggers computing device 10 to perform the various techniques of this disclosure. In such instances, camera processor(s) 14 may receive user input indicating the particular camera mode. In some examples, user interface 22 may provide a user with the option to manually adjust zoom settings, such as a zoom rate. In another example, user interface 22 may provide a user with the option to apply an adjusted zoom setting to at least one frame of the second set of frames. In a non-limiting and illustrative example, camera processor(s) 14 may receive a request, via user interface 22, to smooth a zoom transition based on an algorithm that starts a zoom-in process slowly and then proceeds to quicken until a target zoom level is reached, or vice versa. In any case, camera processor(s) 14 may, in response to the user input, determine the second set of frames in accordance with the particular camera mode. In a non-limiting example, the camera mode may include a smooth zoom mode that a user may select via user interface 22. As such, camera processor(s) may generate, as a camera mode, the second set of frames, with the camera mode being enable in response to user input.

In some examples, computing device 10 may include multiple camera processors 14 that are configured to perform the techniques of this disclosure. In such examples, a first camera processor 14 and a second camera processor 14 may perform, in parallel or in tandem, the techniques of this disclosure. In an illustrative example, a first camera processor 14 may transfer the plurality of captured frames to one or more other camera processor(s) 14. In addition, the first camera processor 14 may generate and transfer the first set of frames, and/or information regarding a first set of zoom transitions, to one or more other camera processor(s) 14. The one or more other camera processor(s) may subsequently alter at least a subset of the plurality of frames to represent a second set of zoom transitions different from the first set zoom transitions.

In an illustrative example, a first one of camera processor(s) 14 may determine a first set of frames, and a second one of camera processor(s) 14 may determine, in accordance with the camera mode, the second set of frames. The second camera processor 14 may determine and/or generate the second set of frames in accordance with a selected camera mode (e.g., a smooth zoom camera mode).

In addition, the first camera processor 14 may output the first set of frames for display, such as for preview display. The second camera processor 14 may output the second set of frames, such as to video encoder/decoder 17. In such instances, video encoder/decoder 17 may generate the second set of frames by encoding the second set of frames determined by the second camera processor 14. Video encoder/decoder 17 may encode the second set of frames based on adjusted zoom settings, 3A parameters, etc. In such instances, a first frame of the first set of frames comprises a first zoom setting. As such, a first frame of the second set of frames may have a second zoom setting that is distinct from a first zoom setting applied to a first frame of the first set of frames.

In another example, camera processor(s) 14 may receive, via user interface 22, indication of one or more target zoom levels. For example, a user may experiment with a particular zoom feature (e.g., altering zoom levels), while video is being recorded concurrently. After experimenting, the user may determine satisfaction with a particular zoom setting. In such instances, the user may provide an affirmative indication, such as through actuation of a soft key button via user interface 22, that the user desires a particular zoom setting, such as a particular zoom level. In another example, camera processor(s) 14 may determine the indication using one or more algorithms that may determine that a zoom level has been applied for a particular amount of time or to a particular number of frames. In such examples, an AI algorithm or ML model may determine various thresholds for an amount of time or a number of frames. In any case, camera processor(s) 14 may identify one or more target zoom levels in this fashion without receiving, via user interface 22, any express or affirmative indications as to zoom levels desired by the user, such as an affirmative key press via user interface 22.

In a non-limiting and illustrative example, camera processor(s) 14 may determine, based on the one or more target zoom levels, a second set of zoom transitions. The second set of zoom transitions may include an immediate switch to a target zoom level (e.g., a desired zoom level), such that, when viewing the second set of frames that represent the second set of zoom transitions (e.g., as video playback), a user would not perceive the transition to the target zoom level. That is, the target zoom level would be applied to the initial frame of the second set of frames, where subsequent zoom transitions may follow the initial frame or subsequent frames. In another example, the second set of zoom transitions may include gradual transitions, starting from a first frame representing a first zoom level to a subsequent frame in order to achieve the target zoom level.

In some examples, camera processor(s) 14 may cause a display device to synchronize, in a single display 28, the plurality of frames of the image/video data and the first set of frames. In one example, camera processor(s) 14 may cause display interface 26 to synchronize display of both the plurality of frames and the first set of frames. That is, camera processor(s) 14 may cause display interface 26 to synchronize, in a single display, both the plurality of frames and the first set of frames. In one example, camera processor(s) 14 may cause display interface 26 to display, in a side-by-side view, a first set of actively-zooming frames alongside a plurality of corresponding, although non-zooming, frames. In another example, camera processor(s) 14 may cause a display device 28 to provide a picture-in-picture display. This may be so that a user may visualize what image sensor(s) 12 are capturing at full FOV, even though the first set of preview frames may have some pixels cropped from view according to various zoom settings.

In some examples, zoom settings adjuster 46 may utilize AI and/or ML models to determine a first set of adjusted zoom settings that first frame generator 42 may apply when generating a first set of frames (e.g., the first set of preview frames). The AI and/or ML models may be trained on zoom sensitivities of a UI zoom mechanism, user zoom history and statistics, response time of a user relative to the zoom sensitivity of the UI, etc. In such instances, zoom settings of the first set of frames may be adjusted during preview of the frames such that the zoom settings are different from the user command. That is, if a user has a tendency to over zoom or under zoom due to the particularities of UI 22, zoom settings adjuster 46 may compensate for insensitive zoom maneuvers of the user in real-time as the user is providing the zoom commands. From a user perspective the first set of preview frames may represent zoom transitions that lag or lead the zoom commands of the user. This compensation may evolve over time based on continual AI or ML training. In any case, the second set of frames comprising the second set of adjusted zoom settings may nevertheless be different than the first set of frames comprising the first set of adjusted zoom settings. That is, although the first set of adjusted zoom settings represent adjusted zoom settings, further adjustment may be needed, such that the second set of adjusted zoom settings is different from the first set of adjusted zoom settings.

Figure 5:
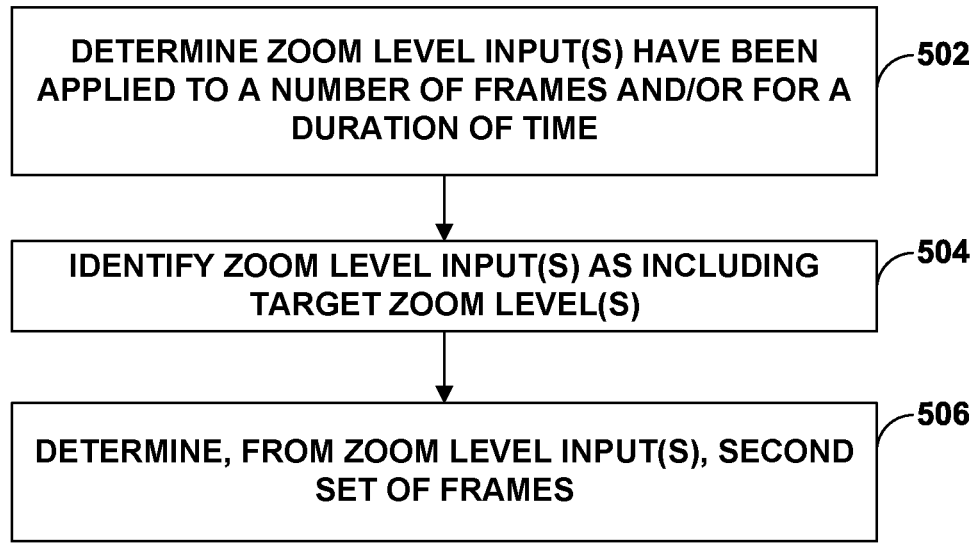
FIG. 5 is a flow diagram illustrating an example method and technique for identifying target zoom levels from zoom settings, in accordance with various aspects of the techniques described in this disclosure.

FIG. 5 is an example flow diagram illustrating example operations of camera processor(s) 14 shown in FIG. 1 in accordance with various aspects of the techniques described in this disclosure. In some examples, the zoom settings comprise a plurality of zoom level inputs (e.g., a pinch-tozoom input, gaze input, etc.). As such, camera processor(s) 14 may determine that one or more zoom level inputs have been applied to a predefined number of frames or to a particular number of frames, applied for a predefined duration of time or for a particular duration of time, and/or otherwise, applied in such a way that indicates a focus for the second set of frames (502). In an illustrative and non-limiting example, camera processor(s) 14 may receive zoom settings 23 including zoom level transitions lasting less than 0.1 second each until a particular zoom level is reached, at which point the zoom level (e.g., a target zoom level) may be detected for greater than a threshold amount of time (e.g., the particular duration of time). In a non-limiting example, the threshold amount of time may still be a relatively short period of time, such as 1.0 seconds or 1.5 seconds. In any case, the threshold amount of time may vary over time, as well as a threshold number of frames. In some examples, camera processor(s) 14 may employ AI or ML techniques to tailor various thresholds based on user behavior. For example, camera processor(s) 14 may deploy an AI engine and/or ML model trained on zoom behavior, tendencies, and/or preferences of a user, such that camera processor(s) 14 may determine, via the AI engine and/or ML model, whether one or more zoom level inputs includes a target zoom level, multiple target zoom levels, or advantageously, an inadvertent zoom.

In some examples, camera processor(s) 14 may determine that one or more zoom level inputs has been indicated as comprising a target zoom level. That is, camera processor(s) 14 or CPU 16 may receive, via user interface 22, explicit indication that an applied zoom level represents a desired zoom level. In some examples, user interface 22 may include an option for a user to accept, or otherwise indicate as acceptable, a particular zoom level input. In an illustrative example, camera processor(s) 14 may receive user input that causes a first set of frames to represent zoom transitions from a first zoom level to a second zoom level and from the second zoom level to a third zoom level. Camera processor (s) 14 may receive indication, via user interface 22, that the third zoom level was the targeted zoom level. For example, the user may, once at the third zoom level, select the option to proceed with the third zoom level as the ultimately desired zoom level. In this example, camera processor(s) 14 may determine a second set of frames, based at least in part on the plurality of frames received by image sensor(s) 12 or on at least a subset of the first set of frames. The second set of frames may comprise a single zoom level at the third zoom level. In another example, the second set of frames may comprise multiple zoom levels. In an example, the second set of frames may comprise multiple zoom levels forego the second zoom level or first zoom level in favor of a second set of frames comprising a greater number of frames that are represented by the target zoom level. In any case, the second set of frames may, in some instances, more closely depict a zoom that a user may have originally intended.

Similarly, camera processor(s) 14 may detect a particular zoom level applied to a particular number of frames that exceeds a threshold or exceeds an amount relative to the number of frames corresponding to previous intermediate zoom levels. Such a prolonged application of one or more zoom levels indicates that the one or more zoom levels are ultimately what a user desired (e.g., target zoom level(s)). In such instances, camera processor(s) 14 may identify the one or more particular zoom level inputs as including one or more target zoom levels (504). That is, camera processor(s) 14 may identify a particular zoom level input as corresponding to a target zoom level (e.g., a zoom level ultimately desired by the user).

In some examples, camera processor(s) 14 may determine, based at least in part on the one or more target zoom levels, the second set of frames (506). In another example, camera processor(s) 14 may determine, based at least in part on the one or more zoom level input(s), the second set of frames. In such instances, camera processor(s) 14 identify the zoom level input(s) as comprising target zoom level(s). In some examples, camera processor(s) 14 may determine one or more zoom parameters that define a second set of one or more zoom transitions. For example, the one or more zoom parameters may include a zoom rate (e.g., slow zoom, fast zoom), digital cropping amount, adjustment to coordinates of digitally cropped portion, such as when a user moves camera 15 or pans across a scene to re-center on a particular object in the scene. In an example, a user may attempt to zoom-in on an object in the scene but may over zoom and need to simultaneously zoom-out and move the camera 15 to point in a different direction at the object. In such instances, camera processor(s) 14 may determine the zoom parameters based on the zoom input and movement of the object. AOF tracking system 36 may detect movement of the object relative to the image frames. That is, while the object in the scene may be stationary, lens 13 may move relative to a 3-D physical or virtual space. For example, lens 13 may move in the 3-D space, such as laterally, toward the object, away from the object, etc. In any case, the frame may move with camera 15, in which case, AOF tracking system 36 may detect, with reference to the frame, movement of the otherwise stationary object. In some examples, AOF tracking system 36 may detect changes in one or more AOFs that comprise one or more detected object(s)-of-interest.

In some examples, the first set of zoom transitions may include a first zoom transition from a first zoom level to a second zoom level. In such examples, the second set of one or more zoom transitions may include a first smoothed zoom transition that represents a zoom transition from the first zoom level to a target zoom level. The target zoom level may include a first target zoom level identified from a plurality of targeted zoom levels. In any case, the target zoom level may be different from the second zoom level. For example, the second zoom level may be 11.0× and the desired zoom level may be 10.5×. In such instances, the adjusted zoom transition, as defined by the second set of zoom transitions, may be from 1.0× to 10.5× (rather than 1.0× to 11.0× to 10.5×).

Figure 6:
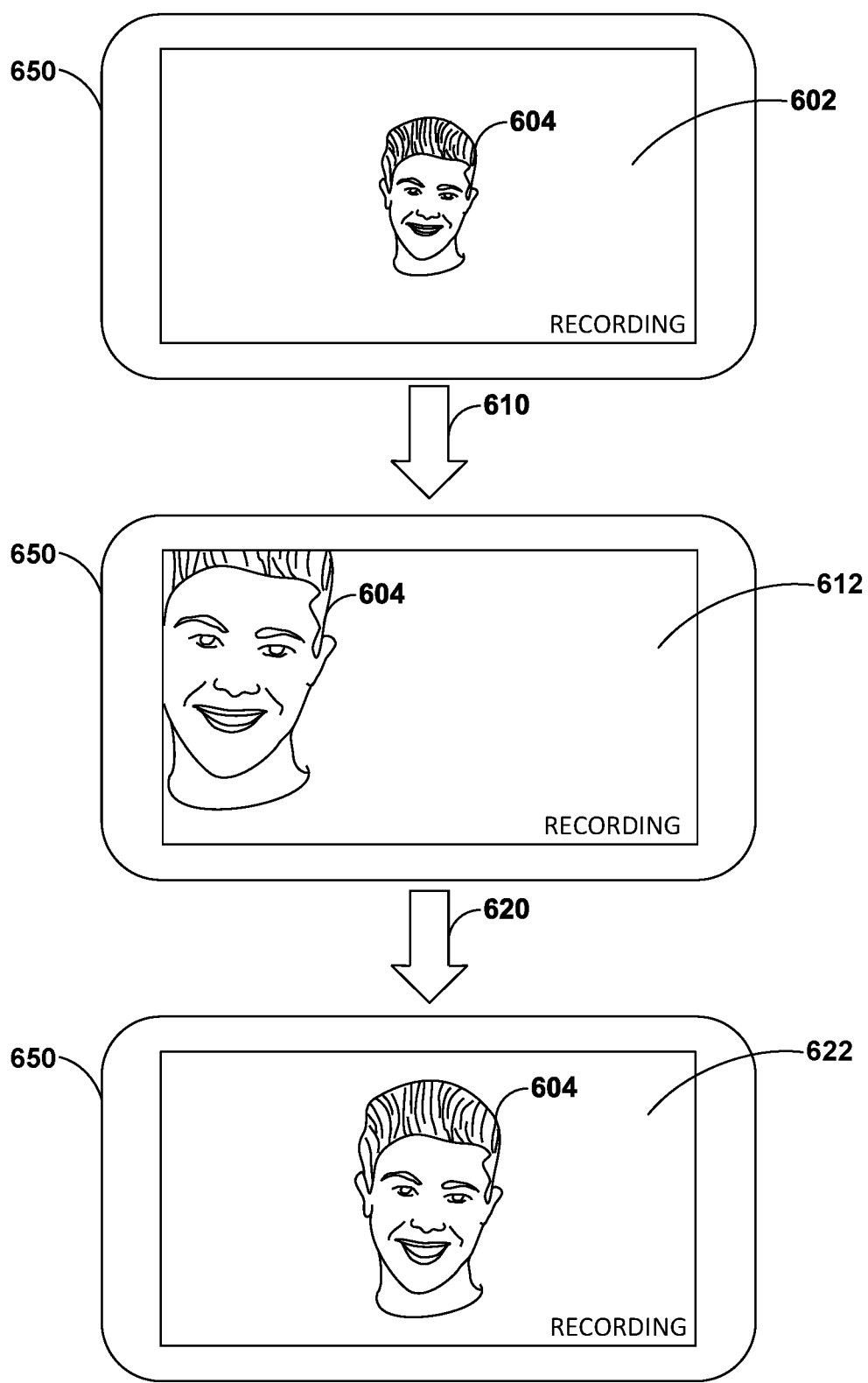
FIG. 6 is an illustration of an example image capture sequence represented by an example first set of preview frames that include multiple zoom levels, in accordance with various aspects of the techniques described in this disclosure.

FIG. 6 is an example illustration of an example image capture sequence including multiple zoom settings. As shown, a first set of preview frames 602, 612, 622 represents the multiple zoom settings.

In the example of FIG. 6, a first zooming frame 602 may be captured and stored using a camera 650. Camera 650 is an example of camera 15 or computing device 10. Camera processor(s) 14 may receive zoom settings 610 that result in a zoom transition from frame 602 to frame 612 having a different preview zoom level. Camera 650 may detect person 604 in the frames. After a user spends some time trying to get the zoom level correct, zooming frame 622 may represent an ideal zoom for recording of person 604. In such examples, the first set of zooming frames include preview frames configured for preview display. That is, camera processor(s) 14 may output, for preview display, the first set of frames 602, 612, 622 (e.g., a first set of zooming frames).

Figure 7:
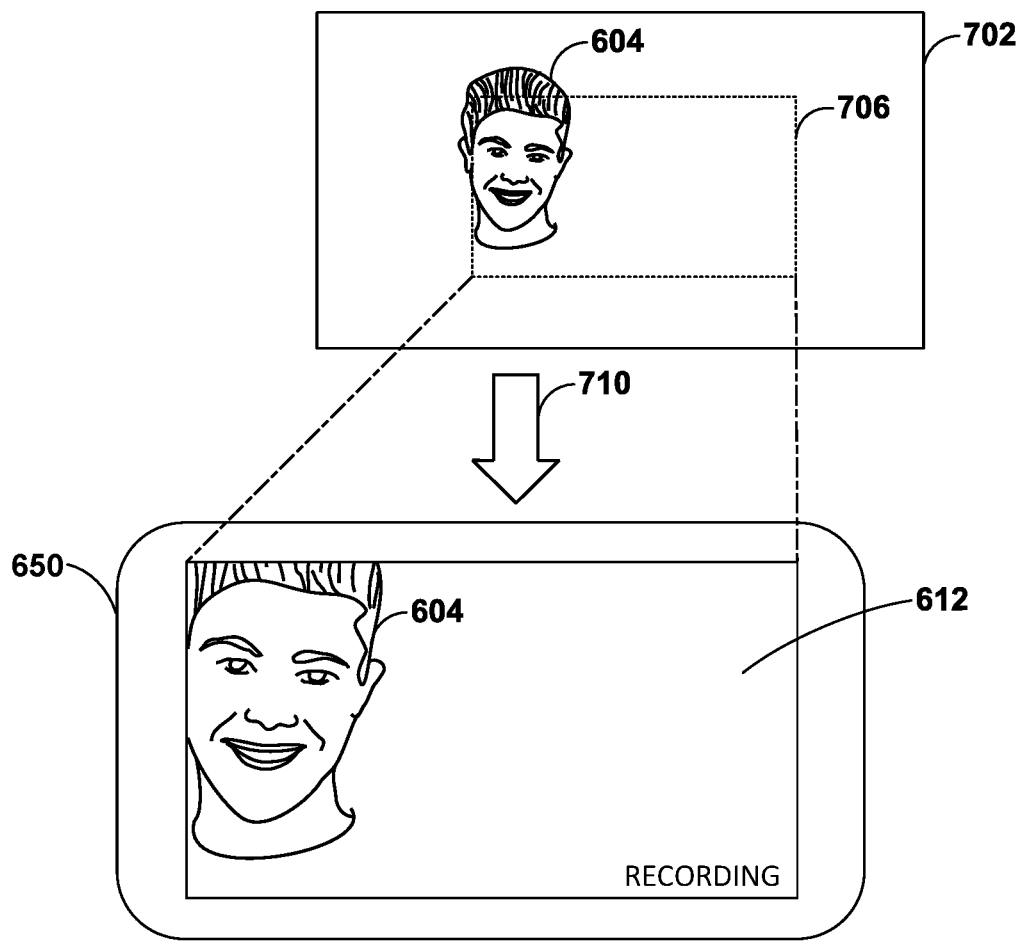
FIG. 7 is an illustration of an example captured frame from a plurality of captured frames and an example preview frame from an example first set of preview frames, in accordance with various aspects of the techniques described in this disclosure.
Figure 8:
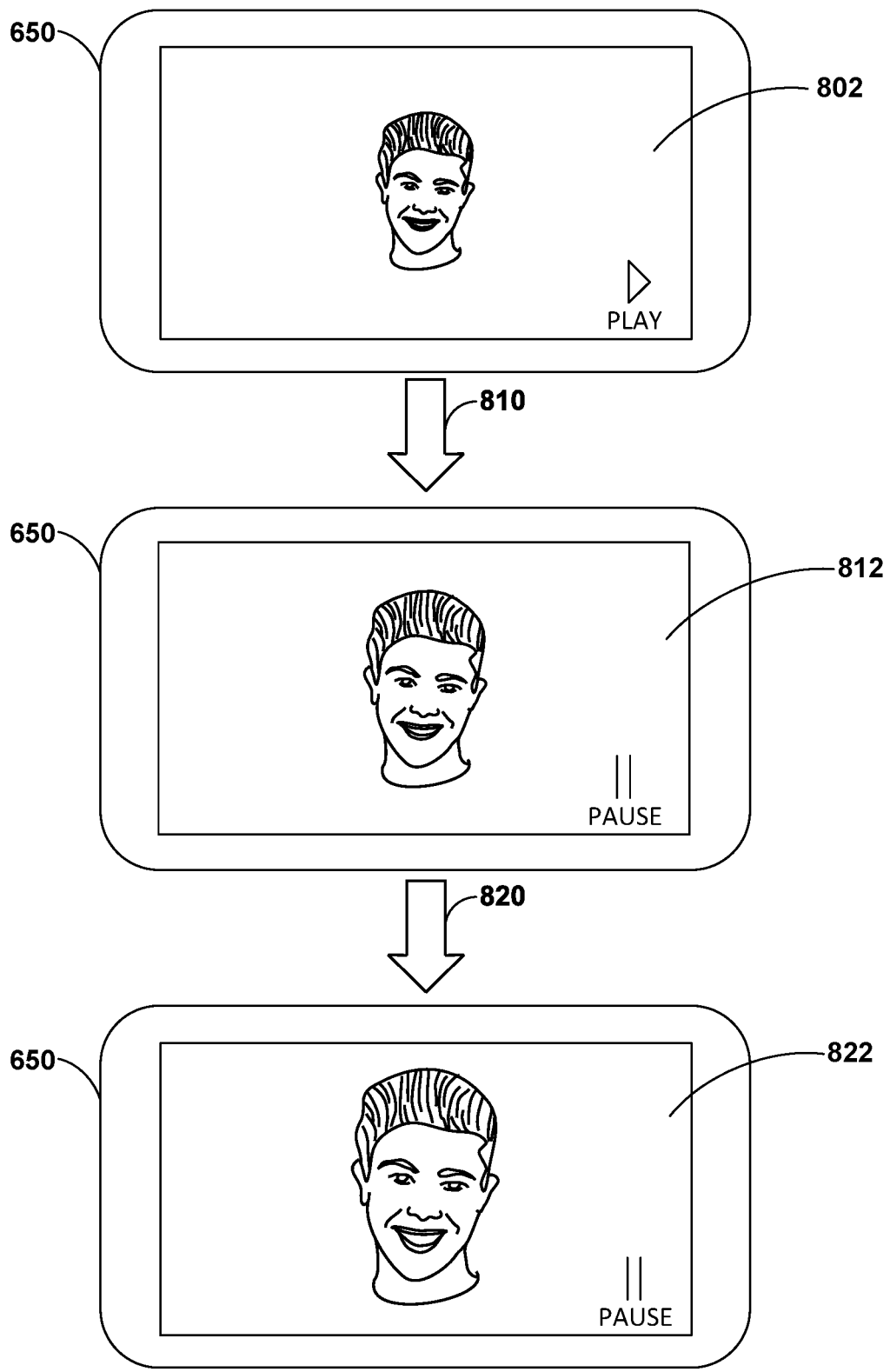
FIG. 8 is an illustration of an example second set of frames having adjusted zoom settings, in accordance with various aspects of the techniques described in this disclosure.

FIG. 7 is an example illustration of a captured frame relative to a zoomed in display view of an area of the captured frame, in accordance with various aspects of the techniques described in this disclosure. For example, frame 702 may represent a full FOV frame capture from the plurality of frames. A digitally cropped portion 706 for zooming may provide the zooming frame 612 that is the second zooming frame in FIG. 6. Camera processor(s) 14 may perform zoom techniques 710 to provide zoomed in views, such as those shown in FIG. 6 and FIG. 8, although FIG. 8 represents an example of a second set of frames representing smoothed zoom transitions (e.g., a second set of zoom transitions). That is, the zoom transitions are smoothed relative to the zoom transitions shown in FIG. 6.

FIG. 8 is an example illustration of an example second set of frames having smoothed zoom transitions (e.g., a second set of zoom transitions), in accordance with various aspects of the techniques described in this disclosure. The second set of frames is different from the first set of frames 602, 612, 622. Camera processor(s) 14 may generate the second set of frames 802, 812, and 822 based on corresponding frames such as frame 702 in FIG. 7, which corresponds to frames 602 and 802. In the illustrative example, frame 812 corresponds, in time, to frame 612, such that the zoom setting applied to generate preview frame 612 differs from the zoom setting applied to generate corresponding frame 812.

In some examples, in order to identify the one or more desired zoom levels and/or to generate or determine the second set of frames 802, camera processor(s) 14 may perform a detection of at least one of an object or a region in the plurality of frames, such as frame 702. In such examples, camera processor(s) 14 may determine the second set of frames 802, 812, and 822 based at least in part on the detection of the at least one object or region. The second set of frames 802, 812, and 822 may include adjusted zoom transitions 810 and 820. Camera processor(s) 14 may adjust the smoothed zoom transitions 810 and 820 based on zoom settings received when generating or determining the first set of frames. In some examples, the adjusted zoom transitions may include optimized zoom transitions, smoothed zoom transitions, or adjusted zoom settings.

In some examples, when identifying the one or more desired zoom levels and/or determining the second set of frames (e.g., a second set of zooming frames), camera processor(s) 14 may receive, as one of the zoom settings, a zoom command. For example, the zoom command may be a command to zoom from 1.0× to 8.0×. In addition, camera processor(s) 14 may detect a subsequent movement of a frame relative to the object or the region. For example, person 604 is off center relative to frame 702. In such instances, a user may move the camera (e.g., move the frame) in order to center person 604 in frame 702. In such instances, camera processor(s) 14 may identify one or more target zoom levels or determine the second set of frames based at least in part on the detection of the subsequent movement. This is because, in this example, the person is captured fully in the full FOV frames, even though the preview display frame 612 may not show the detected person 604 in full. Similarly, camera processor(s) 14 may identify one or more target zoom levels or determine the second set of frames based at least in part on an AOF detection of the object- or region-of-interest relative to the capture scene (e.g., in the FOV of camera 15). In another example, a user may zoom in on object of interest, but then needs to re-center object in the frame because their zoom input inaccurately zooms in on background objects rather than the object of interest to the user.

Illustrative examples of the disclosure include:

Example 1: A method for camera processing, the method comprising: receiving a plurality of frames of image data; receiving, via a user interface, a zoom setting for each of the plurality of frames; generating, according to the zoom settings, a first set of frames; determining, based on the zoom settings, a second set of frames that differ from the first set of frames; and outputting, for further processing, the second set of frames.

Example 2: A method according to Example 1, wherein determining the second set of frames comprises: generating, from at least a subset of the plurality of frames, the second set of frames, wherein at least one frame from the second set of frames comprises a zoom setting that is different from a corresponding zoom setting utilized for the first set of frames.

Example 3: A method according to any of Examples 1 or 2, wherein the first set of frames represents a transition from a first zoom level to a second zoom level, and wherein the second set of frames represents a transition from the first zoom level to a target zoom level, wherein the target zoom level is different from the second zoom level.

Example 4: A method according to any of Examples 1 through 3, wherein the zoom settings comprise a plurality of zoom level inputs, and wherein determining the second set of frames comprises: determining that a particular zoom level input has been: applied to a predefined number of frames, or applied for a predefined duration of time; identifying the particular zoom level input as comprising a target zoom level; and determining, based on the target zoom level, the second set of frames.

Example 5: A method according to any of Examples 1 through 4, further comprising: outputting, to a memory device or a video encoder, the plurality of frames of the image data, the plurality of frames being stored or encoded as comprising a full field of view (FOV) that corresponds to one or more image sensors configured to capture the plurality of frames.

Example 6: A method according to any of Examples 1 through 5, wherein the second set of frames represent frames of the plurality of received frames that have been digitally cropped, scaled, digitally cropped and scaled, or digitally altered as a result of adapting pixel binning levels.

Example 7: A method according to any of Examples 1 through 6, wherein the second set of frames represents one or more of: an optical zoom transition or a digital zoom transition.

Example 8: A method according to any of Examples 1 through 7, further comprising: outputting, for display, the first set of frames as a set of preview frames.

Example 9: A method according to any of Examples 1 through 8, further comprising: receiving user input indicating a particular camera mode; and in response to the user input, generating the second set of frames according to the camera mode.

Example 10: A method according to any of Examples 1 through 9, wherein determining the second set of frames comprises: performing a detection of at least one of an object or a region in the plurality of frames; and determining the second set of frames based on the detection.

Example 11: A method according to any of Examples 1 through 10, further comprising: applying a first set of automatic adjustment parameters to the plurality of frames; and applying a second set of automatic adjustment parameters to the first set of frames.

Example 12: A method according to Example 11, wherein the second set of automatic adjustment parameters is different from the first set of automatic adjustment parameters.

Example 13: A method according to any of Examples 1 through 12, wherein outputting the second set of frames comprises: outputting the second set of frames to be stored as a video file.

Example 14: An apparatus for camera processing, the apparatus comprising one or more means for performing the methods of any of Examples 1 through 13. For example, the apparatus of Example 14 may include: a memory configured to store image data; and one or more processors in communication with the memory, the one or more processors configured to: receive a plurality of frames of the image data; receive, via a user interface, a zoom setting for each of the plurality of frames; generate, according to the zoom settings, a first set of frames; determine, based on the zoom settings, a second set of frames, the second set of frames being different from the first set of frames; and output, for further processing, the second set of frames.

Example 15: An apparatus according to Example 14, wherein the first set of frames represents a first set of zoom transitions, and wherein the second set of frames represents a second set of zoom transitions, wherein the first set of zoom transitions and the second set of zoom transitions are different from one another.

Example 16: An apparatus according to Example 15, wherein the first set of zoom transitions include a transition from a first zoom level to a second zoom level, and wherein the second set of zoom transitions include a transition from the first zoom level to a target zoom level, the target zoom level being different from the second zoom level.

Example 17: An apparatus according to any of Examples 14 through 16, wherein the zoom settings comprise a plurality of zoom level inputs, and wherein to determine the second set of frames, the one or more processors are configured to: determine that one or more zoom level inputs have been: applied to a particular number of frames, or applied for a particular duration of time; identify the one or more zoom level inputs as including one or more target zoom levels; and determine, based on the one or more zoom level inputs that include the one or more target zoom levels, the second set of frames.

Example 18: An apparatus according to any of Examples 14 through 17, wherein the one or more processors are further configured to: output, to a memory device or a video encoder, the plurality of frames of the image data, the plurality of frames comprising a full field of view (FOV) that corresponds to one or more image sensors configured to capture the plurality of frames.

Example 19: An apparatus according to any of Examples 14 through 18, wherein the second set of frames include frames of the plurality of received frames that have been digitally cropped, scaled, digitally cropped and scaled, or digitally altered as a result of adapting pixel binning levels.

Example 20: An apparatus according to any of Examples 14 through 19, wherein the second set of frames represents one or more of: an optical zoom transition or a digital zoom transition.

Example 21: An apparatus according to any of Examples 14 through 20, wherein the one or more processors are further configured to: output, for display, the first set of frames as a set of preview frames, wherein at least one frame from the first set of frames comprises a different zoom setting than a corresponding frame from the second set of frames.

Example 22: An apparatus according to any of Examples 14 through 21, wherein to determine the second set of frames, the one or more processors are configured to: receive user input indicating a particular camera mode; and in response to the user input, generate the second set of frames in accordance with the particular camera mode.

Example 23: An apparatus according to Example 22, wherein the one or more processors include a first camera processor and a second camera processor, wherein the first camera processor is configured to: output, for display, the first set of frames, and wherein the second camera processor is configured to: determine, in accordance with the particular camera mode, the second set of frames; and output the second set of frames.

Example 24: An apparatus according to any of Examples 14 through 23, wherein to determine the second set of frames, the one or more processors are configured to: perform a detection of at least one of an object or a region in the plurality of frames; and determine, based on the detection, the second set of frames.

Example 25: An apparatus according to any of Examples 14 through 24, wherein the one or more processors are further configured to: apply a first set of automatic adjustment parameters to the plurality of received frames; and apply a second set of automatic adjustment parameters to the first set of frames.

Example 26: An apparatus according to Example 24, wherein the second set of automatic adjustment parameters is different from the first set of automatic adjustment parameters.

Example 27: An apparatus according to any of Examples 14 through 26, wherein to output the second set of frames, the one or more processors are configured to: output the second set of frames to be stored as a video file.

In some implementations, the above-described examples 1-13 and/or 14-27 can be implemented using a computer-readable storage medium storing instructions that when executed cause one or more processors of a device to perform some or all of the various operations. For example, a computer-readable storage medium can be provided storing instructions that when executed cause one or more processors of an apparatus for camera processing to: receive a plurality of frames of image data; receive, via a user interface, a zoom setting for each of the plurality of frames; determine, according to the zoom settings, a first set of frames; determine, based on the zoom settings, a second set of frames, the second set of frames differing from the first set of frames; and output the second set of frames.

In some implementations, the above-described examples 1-13 and/or 14-27 can be implemented using an apparatus comprising one or more means for performing some or all of the various operations. For example, an apparatus for camera processing includes: means for receiving a plurality of frames of image data; means for receiving, via a user interface, a zoom setting for each of the plurality of frames; means for generating, according to the zoom settings, a first set of frames; means for determining, based on the zoom settings, a second set of frames, the second set of frames and the first set of frames differing from one another; and means for outputting, for further processing, the second set of frames.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. An apparatus configured for camera processing, the apparatus comprising:
   a memory configured to store image data; and
   one or more processors in communication with the memory, the one or more processors configured to:
      receive a plurality of frames of the image data from one or more image sensors of a camera configured to capture the plurality of frames;
      receive, via a user interface, a zoom setting for the camera for each of the plurality of frames;
      generate, according to the zoom setting, a first set of frames, wherein the first set of frames includes a transition from a first zoom level to a second zoom level;
      determine, based on the zoom setting, a second set of frames, the second set of frames being different from the first set of frames, wherein the second set of frames includes a transition from the first zoom level to a target zoom level, the target zoom level being different from the second zoom level; and
      output, for further processing, the second set of frames.

2. The apparatus of claim 1, wherein the first set of frames represents a first set of zoom transitions including the transition from the first zoom level to the second zoom level, and wherein the second set of frames represents a second set of zoom transitions including the transition from the first zoom level to the target zoom level, wherein the first set of zoom transitions and the second set of zoom transitions are different from one another.

3. The apparatus of claim 1, wherein the zoom setting comprises a plurality of zoom level inputs, and wherein to determine the second set of frames, the one or more processors are configured to:
   determine that one or more of the zoom level inputs have been:
      applied to a particular number of frames, or
      applied for a particular duration of time;
   identify the one or more zoom level inputs as including the target zoom level; and
   determine, based on the one or more zoom level inputs that include the target zoom level, the second set of frames.

4. The apparatus of claim 1, wherein the one or more processors are further configured to:
   output, to a memory device or a video encoder, the plurality of frames of the image data, the plurality of frames comprising a full field of view (FOV) that corresponds to the one or more image sensors configured to capture the plurality of frames.

5. The apparatus of claim 4, wherein the second set of frames include frames of the plurality of received frames that have been digitally cropped, scaled, digitally cropped and scaled, or digitally altered as a result of adapting pixel binning levels.

6. The apparatus of claim 1, wherein the second set of frames represents one or more of: an optical zoom transition or a digital zoom transition.

7. The apparatus of claim 1, wherein the one or more processors are further configured to:
   output, for display, the first set of frames as a set of preview frames, wherein at least one frame from the first set of frames comprises a different zoom setting than a corresponding frame from the second set of frames.

8. The apparatus of claim 1, wherein to determine the second set of frames, the one or more processors are configured to:
   receive user input indicating a particular camera mode; and
   in response to the user input, generate the second set of frames in accordance with the particular camera mode.

9. The apparatus of claim 8, wherein the one or more processors include a first camera processor and a second camera processor,
   wherein the first camera processor is configured to:
      output, for display, the first set of frames, and
   wherein the second camera processor is configured to:

determine, in accordance with the particular camera mode, the second set of frames; and output the second set of frames.

10. The apparatus of claim 1, wherein to determine the second set of frames, the one or more processors are configured to:

perform a detection of at least one of an object or a region in the plurality of frames; and determine, based on the detection, the second set of frames.

11. The apparatus of claim 1, wherein the one or more processors are further configured to:

apply a first set of automatic adjustment parameters to the plurality of received frames; and apply a second set of automatic adjustment parameters to the first set of frames.

12. The apparatus of claim 11, wherein the second set of automatic adjustment parameters is different from the first set of automatic adjustment parameters.

13. The apparatus of claim 1, wherein to output the second set of frames, the one or more processors are configured to:

output the second set of frames to be stored as a video file.

14. A method for camera processing, the method comprising:

receiving a plurality of frames of image data from one or more image sensors of a camera configured to capture the plurality of frames;

receiving, via a user interface, a zoom setting for the camera for each of the plurality of frames;

generating, according to the zoom setting, a first set of frames, wherein the first set of frames includes a transition from a first zoom level to a second zoom level;

determining, based on the zoom setting, a second set of frames that differ from the first set of frames, wherein the second set of frames includes a transition from the first zoom level to a target zoom level, the target zoom level being different from the second zoom level; and outputting, for further processing, the second set of frames.

15. The method of claim 14, wherein determining the second set of frames comprises:

generating, from at least a subset of the plurality of frames, the second set of frames, wherein at least one frame from the second set of frames comprises a zoom setting that is different from a corresponding zoom setting utilized for the first set of frames.

16. The method of claim 14, wherein the zoom setting comprises a plurality of zoom level inputs, and wherein determining the second set of frames comprises:

determining that a particular zoom level input has been:
applied to a predefined number of frames, or
applied for a predefined duration of time;

identifying the particular zoom level input as comprising the target zoom level; and determining, based on the target zoom level, the second set of frames.

17. The method of claim 14, further comprising:

outputting, to a memory device or a video encoder, the plurality of frames of the image data, the plurality of frames being stored or encoded as comprising a full field of view (FOV) that corresponds to the one or more image sensors configured to capture the plurality of frames.

18. The method of claim 14, wherein the second set of frames represents frames of the plurality of received frames that have been digitally cropped, scaled, digitally cropped and scaled, or digitally altered as a result of adapting pixel binning levels.

19. The method of claim 14, wherein the second set of frames represents one or more of: an optical zoom transition or a digital zoom transition.

20. The method of claim 14, further comprising:
outputting, for display, the first set of frames as a set of preview frames.

21. The method of claim 14, further comprising:
receiving user input indicating a particular camera mode; and in response to the user input, generating the second set of frames according to the camera mode.

22. The method of claim 14, wherein determining the second set of frames comprises:

performing a detection of at least one of an object or a region in the plurality of frames; and determining the second set of frames based on the detection.

23. The method of claim 14, further comprising:
applying a first set of automatic adjustment parameters to the plurality of frames; and applying a second set of automatic adjustment parameters to the first set of frames.

24. The method of claim 23, wherein the second set of automatic adjustment parameters is different from the first set of automatic adjustment parameters.

25. The method of claim 14, wherein outputting the second set of frames comprises:

outputting the second set of frames to be stored as a video file.

26. A non-transitory computer-readable storage medium having stored thereon instructions that, when executed, cause one or more processors to:

receive a plurality of frames of image data from one or more image sensors of a camera configured to capture the plurality of frames;

receive, via a user interface, a zoom setting for the camera for each of the plurality of frames;

determine, according to the zoom setting, a first set of frames, wherein the first set of frames includes a transition from a first zoom level to a second zoom level;

determine, based on the zoom setting, a second set of frames, the second set of frames differing from the first set of frames, wherein the second set of frames includes a transition from the first zoom level to a target zoom level, the target zoom level being different from the second zoom level; and output the second set of frames.

27. The non-transitory computer-readable storage medium of claim 26, wherein the one or more processors are further caused to:

generate, based at least in part on the plurality of frames, the second set of frames, wherein at least one frame from the second set of frames has a different zoom setting than a corresponding frame from the first set of frames.

28. The non-transitory computer-readable storage medium of claim 26, wherein the zoom setting comprises a plurality of zoom level inputs, and wherein the one or more processors are further caused to:

determine that one or more particular zoom level inputs have been:
indicated as comprising the target zoom level,
applied to a predefined number of frames, or applied for a predefined duration of time; and
generate, based on the one or more zoom level inputs, the second set of frames.

\* \* \* \* \*